US011750311B1

(12) United States Patent
Devarajan et al.

(10) Patent No.: US 11,750,311 B1
(45) Date of Patent: Sep. 5, 2023

(54) STACKED NETWORK DEVICE AS PRECISION TIME PROTOCOL BOUNDARY CLOCK

(71) Applicant: HEWLETT PACKARD ENTERPRISE DEVELOPMENT LP, Houston, TX (US)

(72) Inventors: Venkata Varadhan Devarajan, Bangalore (IN); Nick E. Demmon, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/977,267

(22) Filed: Oct. 31, 2022

(51) Int. Cl.
*H04J 3/06* (2006.01)
*H04L 47/41* (2022.01)

(52) U.S. Cl.
CPC .......... *H04J 3/0667* (2013.01); *H04J 3/0685* (2013.01); *H04L 47/41* (2013.01)

(58) Field of Classification Search
CPC ...... H04J 3/0658; H04J 3/0661; H04J 3/0664; H04J 3/0667; H04J 3/067; H04J 3/0685; H04J 3/0697; H04J 3/0673; H04J 3/0644; H04J 3/0655; H04L 69/28; H04L 47/41; H04L 7/0008; H04L 7/0012; H04W 56/001; H04W 56/0015
See application file for complete search history.

(56) References Cited

U.S. PATENT DOCUMENTS

| | | | |
|---|---|---|---|
| 2020/0304224 A1* | 9/2020 | Neugeboren | H04L 43/106 |
| 2021/0153148 A1* | 5/2021 | Joseph | H04W 76/10 |
| 2022/0329337 A1* | 10/2022 | Anand | H04Q 11/0067 |

* cited by examiner

*Primary Examiner* — Peter Chen
(74) *Attorney, Agent, or Firm* — Jones Robb PLLC

(57) ABSTRACT

Systems, methods, and devices are described which implement an internal Precision Time Protocol (PTP) instance on a stacked network device within a larger external PTP instance in the network to which the stacked network device. The internal instance of PTP is local to the stacked network device synchronizes the N devices ("members") in the stack. Each of the members of the stacked network device may act as a BC in this local virtual instance of PTP. One member, which may be referred to as the commander node or primary member node, may synchronize its clock based on an external GSC or external BC, and then that member may act as a BC for a downstream member, and so on in an iterative manner until all of the members within the stacked network device have synchronized clocks. The individual members may also act as BCs to the external endpoints coupled thereto, providing PTP timestamp messages to those endpoints.

20 Claims, 21 Drawing Sheets

STACKED NETWORK DEVICE AS PRECISION TIME PROTOCOL BOUNDARY CLOCK

Electronic devices in the same local area may be interconnected to form a Local Area Network (LAN). Some networked devices may permit or require distribution of time (i.e., "time-of-day") to facilitate network and/or device operations. The Precision Time Protocol or Precise Time Protocol (PTP) is defined by the IEEE 1588 and IEEE 802.1AS standards to distribute and synchronize time-of-day among networked entities with sub-microsecond (or even sub-nanosecond) precision. Effective time synchronization may be used for many applications, including network-based audio/video deployments, public announcement systems, power transmission stations, industrial measurement and control systems, and the like.

BRIEF DESCRIPTION OF THE DRAWINGS

These and other more detailed and specific features of various example implementations are more fully disclosed in the following description, reference being had to the accompanying drawings, in which.

Figure 1:
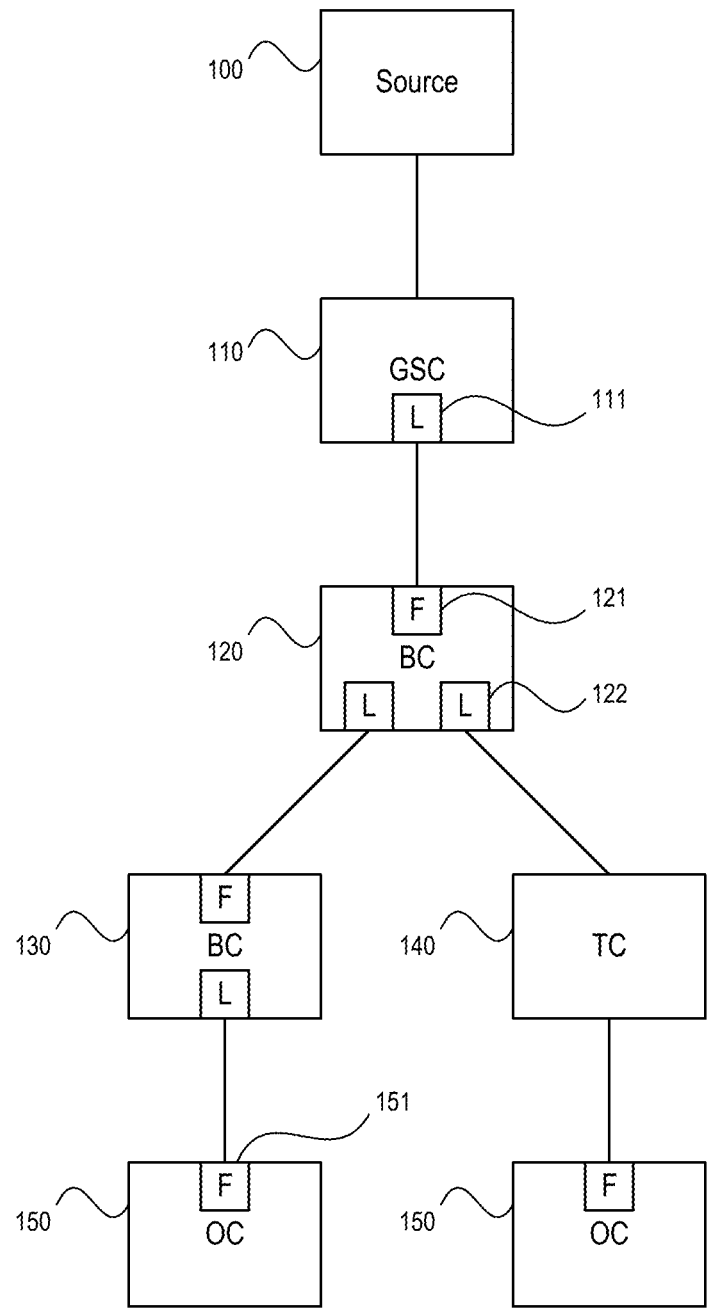
FIG. 1 illustrates an exemplary network implementing PTP in accordance with various aspects of the present disclosure.

The drawings are included to provide a further understanding of the present disclosure and are incorporated in and constitute a part of this specification. The drawings illustrate one or more examples of the present teachings and together with the description explain certain principles and operations.

DETAILED DESCRIPTION

In the following description, numerous details are set forth, such as flowcharts, schematics, and system configurations. It will be readily apparent to one skilled in the art that these specific details are merely exemplary and not intended to limit the scope of this application. In addition to the particular systems, devices, and methods described herein, the operations described herein may be implemented as computer-readable instructions or methods, and/or a processing node or nodes on the network for executing the instructions or methods. Individual devices or processing nodes may respectively include a processor included in the individual device or node and/or a processor included in any controller device or node in the network that is coupled to the individual device or node.

At its base level, a network implementing PTP includes at least three entities. The first entity is a Grandsource Clock (GSC), sometimes referred to as a "Grandmaster Clock" (GMC), which acts as an authentic source of time for the network. Thus, the GSC is generally connected to an external time reference such as a GPS or CDMA clock. The second entity is an intermediary network device (e.g., a switch or a router) which propagates timestamps from the GSC. The third entity is an endpoint or Ordinary Clock (OC) which receives the timestamps from the GSC via the intermediary, and which updates its local clock to be in time synch with the GSC. The intermediary network device is categorized based on the role it plays in PTP propagation. If the intermediary device receives a PTP packet carrying a timestamp from the GSC, adds a forwarding latency associated with the PTP packet on that intermediary device, and passes the modified PTP packet to a downstream device, it is referred to as a Transparent Clock (TC). A TC does not synchronize its local clock with the GSC. If the intermediary device consumes a PTP packet from the GSC, synchronizes its local clock with the GSC, and then sends a new PTP packet to downstream devices, it is referred to as a Boundary Clock (BC). Unlike a TC, a BC may propagate timestamps to another downstream BC, to an endpoint directly connected to it, or to an endpoint connected via a TC. Generally, BCs are used to relieve load on upstream devices (including the GSC) by reducing the number of network devices that are directly connected to the upstream devices.

It is possible for multiple distinct network devices to be aggregated together and cooperate with one another so that they collectively appear and function as a single device to the rest of the network. The resulting logical entity may be referred to herein as a "stacked device." One such implementation for a stacked device is Virtual Switching Framework (VSF), which defines a virtual device (e.g., a virtual switch) comprising multiple individual physical devices (e.g., physical switches) interconnected through physical (e.g., Ethernet) links. These physical devices operate with one control plane, visible to peers as a virtual device stack. This composition may simplify management and provides the capability to scale the stack.

In some circumstances, it may be desired to use a stacked device as an intermediate network device in a PTP network. However, until now this has been difficult or infeasible. A standalone device may operate as a TC or a BC in a straightforward manner. However, because there are N>1 (usually many) devices in a stacked device, each with its own clock, it is not straightforward to configure the stacked device so that it is synchronized with the GSC but also appears as a single clock to the GSC and to the rest of the downstream network, and thus it has heretofore been infeasible to utilize a stacked device as a BC. Configuring a stacked device as a TC may be more straightforward but may lead to undesirable side effects. For example, in comparative approaches, a stacked device may operate as a TC with each device in the stack receiving timestamps from an external BC (or from the GSC directly) and adding its own forwarding latency. However, because each device in the stack may have M endpoints (clients) connected thereto, the stacked device may have to handle a large PTP load from M×N endpoints. M×N can be very large, easily ranging into the hundreds or more in some deployments. If the stacked device is configured as a TC, then the network device immediately above the stacked device must operate as a BC for all M×N endpoints of the stacked device. This amount of PTP endpoints can quickly overwhelm the capacity of a BC. Thus, providing the stacked device as a TC, while straightforward, may produce unacceptable results in some contexts. Thus, a solution for providing PTP with stacked network devices without overwhelming the stacked network device or other upstream network devices is needed.

The present disclosure thus provides for systems, methods, and devices which permit a stack of N>1 devices to efficiently provide PTP services to downstream devices by presenting the stacked device itself as a single BC to the other devices in the network (the GSC, any upstream BCs, any downstream BCs or TCs, and the endpoint(s)) while sharing the PTP load among the individual members of the stack and without having a single reference clock for the stack itself (i.e., with each individual device within the stack maintaining its own internal reference clock).

Accordingly, the present disclosure provides for systems, methods, and devices which implement an internal PTP instance (i.e., an instance of PTP internal to the stacked network device) nested within the external PTP instance (i.e., the instance of PTP in the network to which the stacked network device belongs). The internal instance of PTP is local to the stacked network device and synchronizes the clocks of the N devices ("members") in the stack. This internal instance is transparent to devices outside of the stack (i.e., the rest of the network, including the external PTP instance, may be unaware of the internal PTP instance). Each of the members of the stacked network device may act as a BC in this local virtual instance of PTP. One member, which may be referred to as the commander node or primary member node, may synchronize its clock based on an external GSC or external BC, and then that member may act as a BC for a downstream member, and so on in an iterative manner until all of the members within the stacked network device have synchronized clocks. The individual members may also act as BCs to the external endpoints coupled thereto, providing PTP timestamp messages to those endpoints. Although each individual device in the stack handles the BC responsibilities for its connected endpoints, from the perspective of the external endpoints the PTP timestamps sent thereby appear to come from the stacked device as a whole. This allows the PTP load of the M×N endpoints to be distributed over N devices acting as BCs, instead of overwhelming a single external BC, while the stack as a whole appears to the rest of the network as a black box which operates as a single BC. The external PTP instance operates according to the standard with a GSC, BCs/TCs, and endpoints, and simply treats the stacked network device as it would treat any other BC. Thus, examples provided herein allow for a stacked device to be used as an intermediary network device in a PTP network without the drawbacks noted above.

FIG. 1 illustrates an example of a network which implements PTP in accordance with various aspects of the present disclosure. The network includes a clock source 100, a GSC 110, and a plurality of network devices, including BCs 120 and 130, a TC 140, and OCs (endpoints) 150. The GSC 110, the BCs 120 and 130, the TC 140, and the OCs 150 may collectively be referred to as a "PTP domain." While FIG. 1 illustrates two BCs 120 and 130, a single TC 140, and two OCs 150, in practical implementations the network may include any number of BCs 120 and 130, TCs 140, and OCs 150, including zero of any of the types of network devices. Any of the network devices may have a processor, a memory, a clock, and input/output (I/O) ports. The I/O ports may include input ports, output ports, uplink ports which provide a connection to upstream devices, downlink ports which provide a connection to downstream devices, and combinations thereof (e.g., an uplink input port, a downlink port for both input and output, etc.). The network devices may be, for example, switches and/or routers.

The clock source 100 provides a time reference for the network that is considered by the PTP domain to be a "standard" (i.e., a highly-accurate) time, and thus the clock source 100 may be referred to as a standard clock. The clock source 100 may be, for example, a Global Positioning System (GPS) satellite time source, a Code-Division Multiple Access (CDMA) time source, and the like. The clock source 100 is connected to the PTP domain by either a wired link (e.g., optical fiber, copper or another conductor in a cable, etc.) or a wireless link (e.g., a satellite link, a cellular link, etc.). In some implementations, a plurality of clock sources 100 may be provided using either redundant connections of the same type (e.g., a plurality of GPS satellite connections), connections of different types (e.g., a GPS satellite connection and a CDMA connection), or combinations thereof.

The GSC 110 operates as a reference clock for the PTP domain, and all network devices in the PTP domain ultimately derive their time from the GSC 110. Thus, the GSC 110 synchronizes its time to the entire PTP domain through PTP messages exchanged among the network devices. The clock of the GSC 110 itself is synchronized to the time reference provided by the clock source 100. In some implementations, a plurality of GSCs 110 may be provided, either connected to the same clock source 100 or to different clock sources 100 in implementations in which a plurality of clock sources 100 are provided. In implementations with multiple GSCs 110 each as a potential source of the reference clock for the PTP domain, one may manually configure a GSC 110 as the source or may apply an algorithm to elect a GSC 110 as a source. An exemplary algorithm is referred to as the Best Leader Clock (BLC) algorithm as set forth in the IEEE 1588 specification. A downlink port of the GSC 110 outputs a clock signal to downstream devices in the PTP domain, and is referred to as a leader port 111.

A BC 120 or 130 is a clock with more than one PTP port in the PTP domain for time synchronization. A BC 120 or 130 uses its uplink port, referred to herein as a follower port 121, to synchronize its own clock from its upstream clock node. In FIG. 1, a first BC 120 is connected immediately downstream from the GSC 110 and thus synchronizes its time from the GSC 110, whereas a second BC 130 is connected to the first BC 120 and thus synchronizes its time from the first BC 120. A BC 120 or 130 uses its downlink ports, referred to herein as leader ports 122, to synchronize the clocks of downstream devices. A BC 120 or 130 may have any number of leader ports 122, including one or two (as shown) or more. A BC 120 or 130 receives PTP packets at its follower ports 121, consumes the PTP packets, synchronizes its local clock with the GSC 110, and then sends new PTP messages to downstream devices. Exemplary methods employed within a BC 120 or 130 for clock synchronization are described in more detail below with regard to FIG. 8.

A TC 140 is a clock with more than one PTP port in the PTP domain, but which is not required to keep time consistency with other clock nodes. A TC 140 receives PTP messages at an uplink port of the TC 140, performs delay correction for the PTP messages (e.g., by adding the forwarding latency/delay associated with a given PTP packet on the given TC 140), and forwards the PTP messages from a downlink port of the TC 140. A TC 140 does not itself perform time synchronizations. A TC 140 may be an End-to-End Transparent Clock (E2ETC) which forwards non peer-to-peer (P2P) packets in the network and calculates the delay of the entire link; or may be a Peer-to-Peer Transparent Clock (P2PTC) which forwards only synchronization, follow-up, and announce messages, terminates other PTP messages, and calculates the delay of each link segment.

An OC 150 is a clock with a single PTP port in the PTP domain for time synchronization. An OC 150 synchronizes time from its upstream clock node, whether the upstream clock node is a BC 120, 130 or a TC 140. The PTP port on which the OC 150 receives messages is referred to as a follower port 151. Connections between network devices in the PTP domain (i.e., among the GSC 120, BCs 120 and 130, TCs 140, and OCs 150) may be Ethernet connections which provide a full-duplex communication path between the connected devices. It is assumed that the delay for uplink transmissions is equivalent to the delay for downlink transmissions. The connections may transmit timestamps in PTP protocol packets which propagate through the network, ultimately reaching the endpoints (i.e., OCs 150).

Individual network devices within the PTP domain may be standalone devices with their own management and control plane, or may be configured from multiple devices which are stacked together to appear and function as one device. A network device configured from multiple stacked devices is referred to herein as a "stacked network device." The number of individual devices within a stacked network device is denoted herein by the integer N. Compared to a standalone network device, a stacked network device may provide increased management simplicity and/or stateful device redundancy in the network. VSF describes one exemplary framework for configuring multiple devices as a stacked network device. A stacked network device configured according to VSF is referred to herein as a VSF stack. While the following description is presented regarding a VSF stack, it should be understood that the configurations, methods, systems, devices, etc. described herein are applicable to any stacked network device even if the device does not strictly implement VSF.

Figure 2:
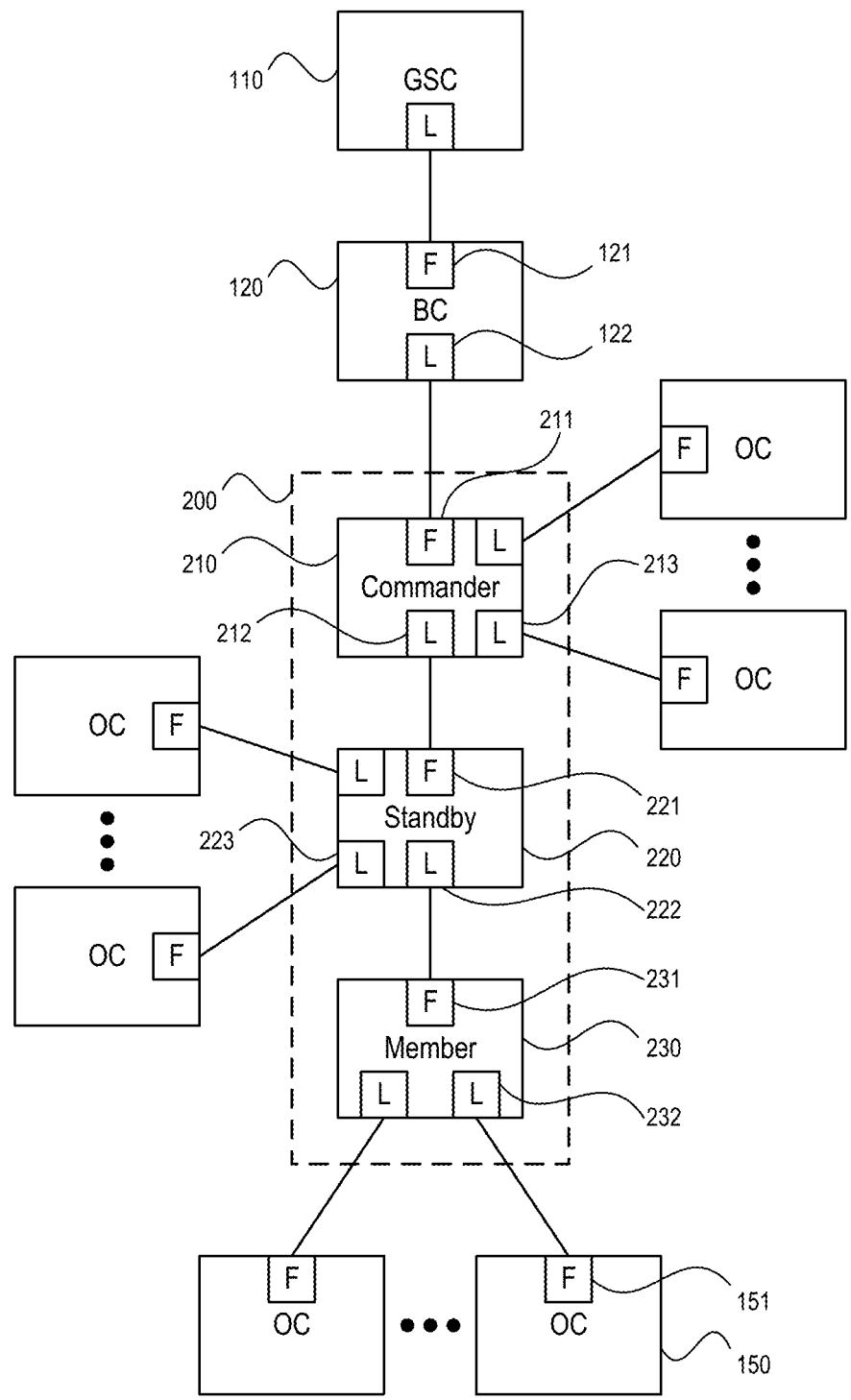
FIG. 2 illustrates an exemplary network implementing PTP and an exemplary stacked device in accordance with various aspects of the present disclosure.
Figure 3:
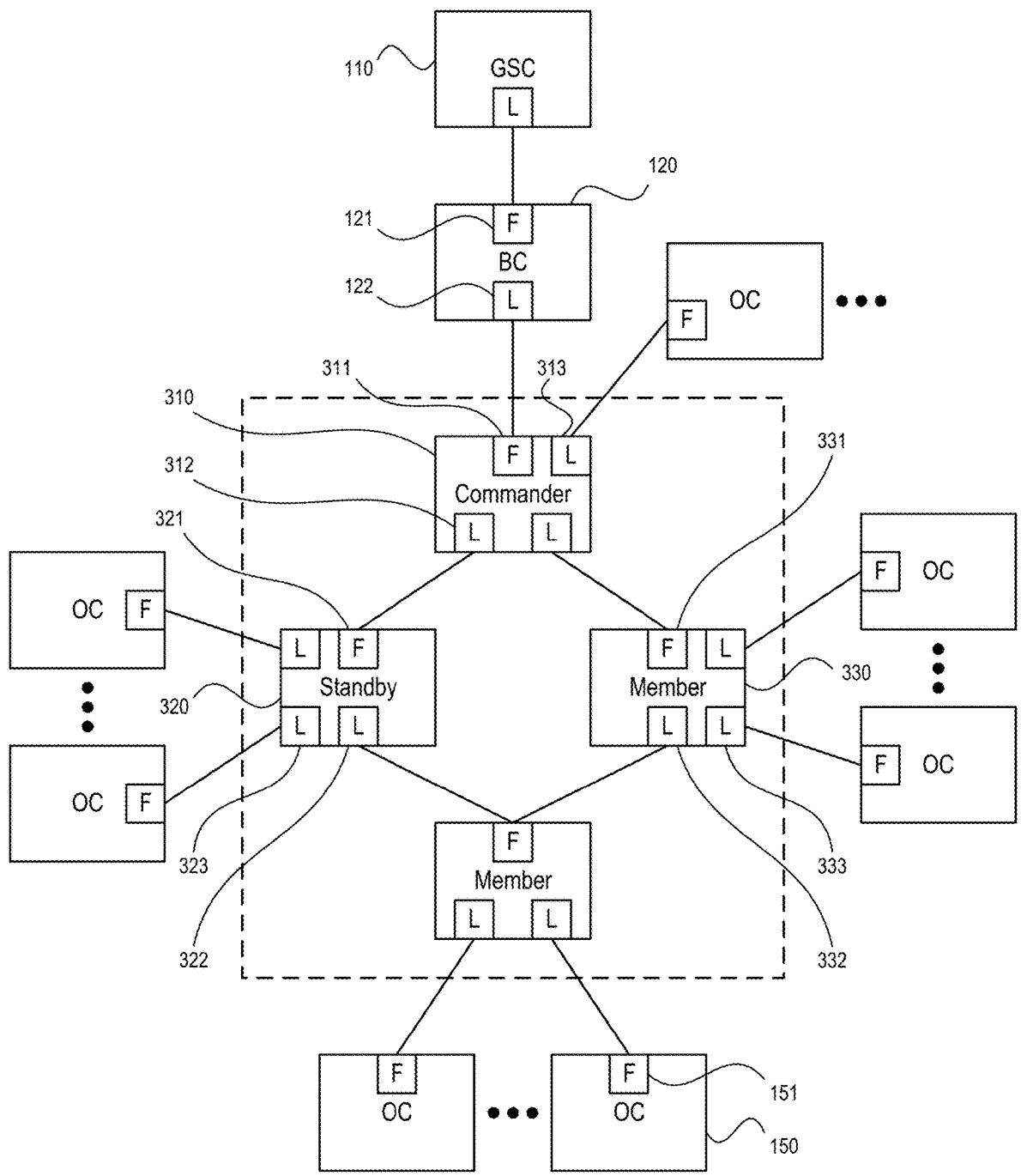
FIG. 3 illustrates an exemplary network implementing PTP and another exemplary stacked device in accordance with various aspects of the present disclosure.

In a VSF stack, each member device may be identified according to a unique member number within the VSF stack but will appear to external devices to be identified as the stack itself (i.e., according to single MAC/IP address for the entire stack). One member device in the VSF stack will operate as a leader for the VSF stack, and is referred to herein as a "commander node" and may be identified as member number 1. Another member device may be designated to operate as the leader for the VSF stack in the event that the commander node becomes unavailable, and is referred to as a "standby node." The standby node may be user configurable. The remaining member devices are referred to as "member nodes." VSF supports N>1 devices connected in either a chain topology or a ring topology. In some implementations, the maximum number of member devices within a single VSF stack is ten, although in other implementations a larger number of member devices may be possible. Exemplary VSF stacks within a network, such as the network of FIG. 1, are illustrated in FIGS. 2 and 3, in which FIG. 2 illustrates a VSF stack having a chain topology and FIG. 3 illustrates a VSF stack having a ring topology. In FIGS. 2 and 3, certain devices are designated using the same reference numerals as in FIG. 1, and reference may be made to the above description of FIG. 1 for details regarding these devices.

In FIG. 2, a GSC 110 is present with a BC 120 immediately downstream therefrom. Downstream from the BC 120, a stacked device 200 is connected. In other examples, the stacked device 200 may be coupled directly to the GSC 110 instead of to a BC 120. In other examples, additional BCs 120 may be interposed between the GSC 110 and the stacked device 200. A plurality of OCs 150 are connected to the stacked device 200, although only six OCs 150 are shown for clarity of explanation and illustration. The stacked device 200 is configured to function as a single virtual device to external network devices in the network (e.g., to the GSC 110, the BC 120, and the OCs 150), and in particular may be configured to operate as a BC of the network. The stacked device 200 includes at least two nodes, which are illustrated in FIG. 2 as a commander node 210, a standby node 220, and a member node 230, each connected in a chain topology. The nodes may be interconnected by member links to exchange data plane traffic. The nodes may be assigned various roles within the stacked device 200, which corresponds to the aforementioned commander node 210, standby node 230, and member node 230. However, when it is not needed to highlight the roles of the nodes or otherwise distinguish them from one another, any of the nodes of the stacked device 200 may be referred to generically as a node or a member node. In practical implementations, a different number of nodes may be present than those illustrated. In particular, the stacked device 200 comprises at least two nodes: i.e., a commander node 210 and at least one other node, such as a standby node 220 or a member node 230. Zero, one, two, or more additional nodes may also be provided in addition to the aforementioned two nodes, and these additional nodes may be termed herein member nodes 230. Moreover, in practical implementations none of the devices within the stacked device 200 may be designated as standby, and thus no standby node 220 may be present.

The commander node 210 is configured to perform control and management plane operations on behalf of the stacked device 200. The commander node 210 includes an uplink port that is connected to the leader port 122 of the BC 120 (or a leader port of the GSC 110 in some examples) and is referred to as a follower port 211. The follower port 211 may be a Link Aggregation Group (LAG) port or dual Routed Only Ports (ROPs). The commander node 210 further includes a downlink port that is connected to a member device within the stacked device 200 (here, the standby node 220) and referred to as an internal leader port 212, and downlink ports that are connected to OCs 150 outside of the stacked device 200 and referred to as external leader ports 213. While FIG. 2 illustrates the commander node 210 as having only one internal leader port 212 and two external leader ports 213, in practice the commander node 210 may have any number and combination of internal leader ports 212 and external leader ports 213.

The standby node 220 includes an uplink port that is connected to the internal leader port 212 of the commander node 210 and referred to as an internal follower port 221. The standby node 220 further includes a downlink port that is connected to a member device within the stacked device 200 (here, the member node 230) and referred to as an internal leader port 222, and downlink ports that are connected to OCs 150 outside of the stacked device 200 and referred to as external leader ports 223. While FIG. 2 illustrates the standby node 220 as having only one internal leader port 222 and two external leader ports 223, in practice the standby node 220 may have any number and combination of internal leader ports 222 and external leader ports 223. Moreover, while FIG. 2 illustrates the standby node 220 as being immediately downstream from the commander node 210, in practice any member device within the stacked device 200 may be designated as the standby node 220 so long as the member device has the capability to run control plane software and manage the other member devices of the stacked device 200.

The member node 230 includes an uplink port that is connected to the internal leader port 222 of the standby node 220 and referred to as an internal follower port 231. The member node 230 further includes downlink ports that are connected to OCs 150 outside of the stacked device 200 and referred to as external leader ports 232. While FIG. 2 illustrates the member node 220 as having two external leader ports 232, in practice the member node 220 may have any number of external leader ports 232. As noted above, the stacked device 200 may include N member devices. Thus, the member node 220 may include one or more internal leader ports which connect to additional member devices within the stacked device 200, for example in implementations in which additional member nodes 220 are present (e.g., N>3). An individual member device within the stacked device 200 may be connected to any integer number M of OCs 150, including zero. Moreover, different member devices may be connected to different numbers M of OCs 150.

In FIG. 3, a GSC 110 is present with a BC 120 immediately downstream therefrom. Downstream from the BC 120, a stacked device 300 is connected. In other examples, the stacked device 300 may be coupled directly to the GSC 110 instead of to a BC 120. In other examples, additional BCs 120 may be interposed between the GSC 110 and the stacked device 300. The stacked device 300 is configured to function as a single virtual device to external network devices in the network (e.g., to the GSC 110, the BC 120, and the OCs 150), and in particular may be configured to operate as a BC of the network. A plurality of OCs 150 are connected to the stacked device 300, although only seven OCs 150 are shown for clarity of explanation and illustration. The stacked device 300 is configured to function as a single virtual device to external network devices in the network (e.g., to the GSC 110, the BC 120, and the OCs 150). The stacked device 300 includes at least three nodes, which are illustrated in FIG. 3 as a commander node 310, a standby node 320, and two member node 330, each connected in a ring topology. The nodes may be interconnected by member links to exchange data plane traffic. The nodes may be assigned various roles within the stacked device 300, which corresponds to the aforementioned commander node 310, standby node 330, and member node 330. However, when it is not needed to highlight the roles of the nodes or otherwise distinguish them from one another, any of the nodes of the stacked device 300 may be referred to generically as a node or a member node. In practical implementations, a different number of nodes may be present than those illustrated. In particular, the stacked device 300 comprises at least three nodes: i.e., a commander node 310, a member node 330, and a third node which may be a standby node 320 or another remember node 330. Zero, one, two, or more additional nodes may also be provided in addition to the aforementioned three nodes, and these additional nodes may be termed herein member nodes 330. Moreover, in practical implementations none of the devices within the stacked device 300 may be designated as standby, and thus no standby node 320 may be present.

The commander node 310 is configured to perform control and management plane operations on behalf of the stacked device 200. The commander node 310 includes an uplink port that is connected to the leader port 122 of the BC 120 (or the leader port of the GSC 110) and is referred to as a follower port 311. The follower port 311 may be a LAG port or dual ROPs. The commander node 310 further includes two downlink ports that are connected to member devices within the stacked device 300 (here, the standby node 320 and one of the member nodes 330, respectively) and referred to as internal leader ports 312, and a downlink ports that are connected to OCs 150 outside of the stacked device 300 and referred to as external leader ports 313. While FIG. 2 illustrates the commander node 310 as having only two internal leader ports 312 and one external leader ports 313, in practice the commander node 310 may have any number and combination of internal leader ports 312 and external leader ports 313.

The standby node 320 includes an uplink port that is connected to the internal leader port 312 of the commander node 310 and referred to as an internal follower port 321. The standby node 320 further includes a downlink port that is connected to a member device within the stacked device 300 (here, the member node 330) and referred to as an internal leader port 322, and downlink ports that are connected to OCs 150 outside of the stacked device 300 and referred to as external leader ports 323. While FIG. 3 illustrates the standby node 320 as having only one internal leader port 322 and two external leader ports 323, in practice the standby node 320 may have any number and combination of internal leader ports 322 and external leader ports 323. Moreover, while FIG. 3 illustrates the standby node 320 as being immediately downstream from the commander node 310 along one branch of the ring, in practice any member device within the stacked device 300 may be designated as the standby node 320 so long as the member device has the capability to run control plane software and manage the other member devices of the stacked device 300.

The member node 330 includes an uplink port that is connected to the internal leader port 322 of the standby node 320 or commander node 310 and referred to as an internal follower port 331. One of the member nodes 330 is shown as including a downlink port that is connected to a member device within the stacked device 300 (here, the other member node 330) and referred to as an internal leader port 332. The member nodes 330 further include downlink ports that are connected to OCs 150 outside of the stacked device 300 and referred to as external leader ports 333. While FIG. 2 illustrates the member nodes 320 as having two external leader ports 333, in practice the member nodes 320 may have any number of external leader ports 333. As noted above, the stacked device 300 may include N member devices. Thus, each of the member nodes 320 may additional internal leader ports 332 which connect to additional member devices within the stacked device 300, for example in implementations in which additional member nodes 320 are present (e.g., N>4). An individual member device within the stacked device 300 may be connected to any integer number M of OCs 150, including zero. Moreover, different member devices may be connected to different numbers M of OCs 150.

Figure 4:
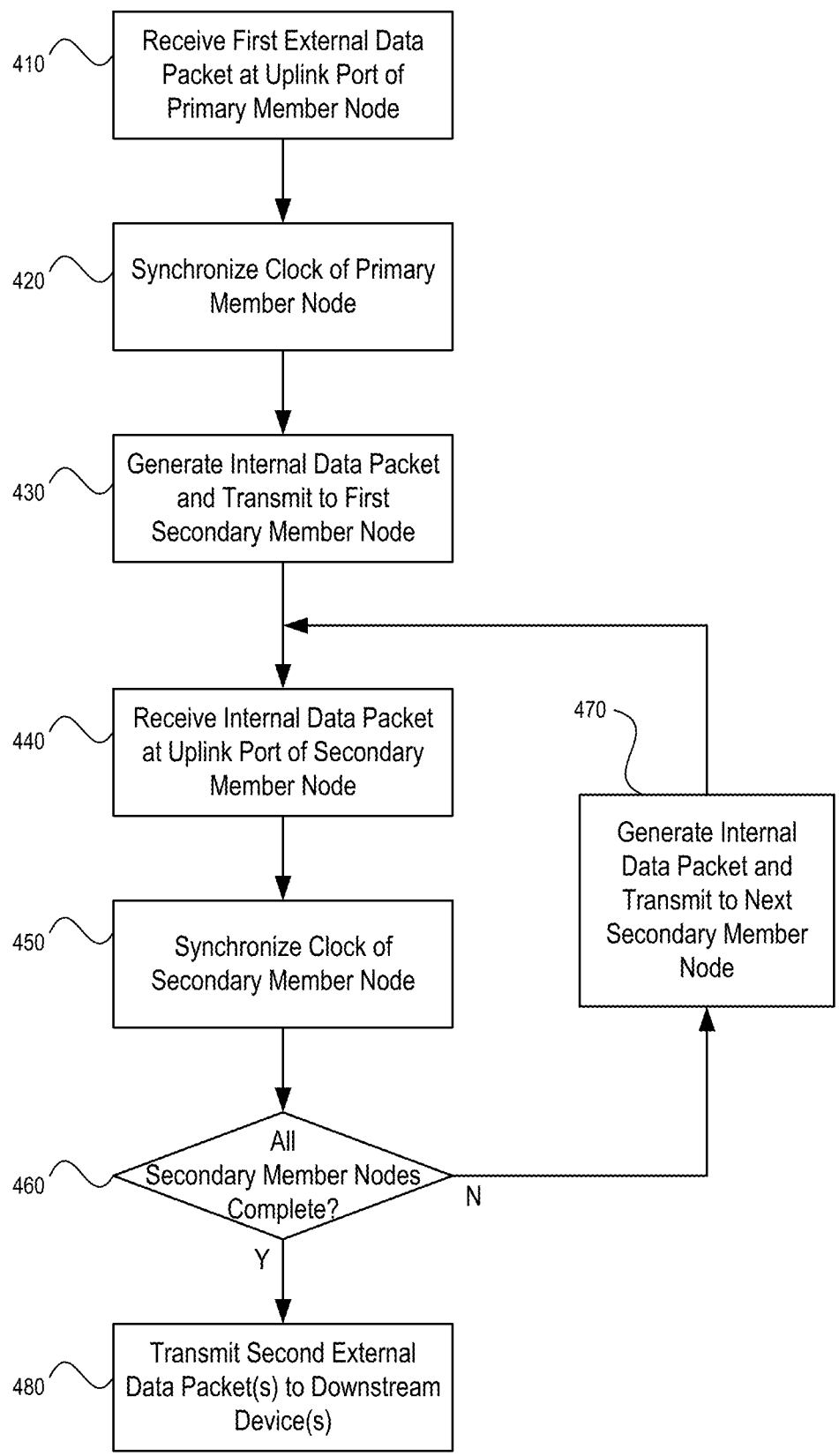
FIG. 4 illustrates an exemplary process flow for time propagation and synchronization in accordance with various aspects of the present disclosure.

A member device of the VSF stack may cause the VSF stack to perform a series of operations for time propagation and synchronization. One example of such a process flow is illustrated in FIG. 4. In FIG. 4, the member device which performs the operations and/or which causes the other member devices to perform operations under its control is referred to as a "primary member node" and the remaining member devices are referred to as "secondary member nodes." For purposes of explanation and illustration, the primary member node may be the commander node 210 of the chain-connected stacked device 200 illustrated in FIG. 2 or the commander node 310 of the ring-connected stacked device 300 illustrated in FIG. 3, and the secondary member nodes may be the standby node 220 and the member node 230 of the chain-connected stacked device 200 illustrated in FIG. 2 or the standby node 320 and the member nodes 330 of the ring-connected stacked device 300 illustrated in FIG. 3. In the case where the operations of FIG. 4 are implemented with the chain-connected stacked device 200 illustrated in FIG. 2, various operations are further illustrated and described with regard to FIGS. 5A-5E. In the case where the operations of FIG. 4 are implemented with the ring-connected stacked device 300 illustrated in FIG. 3, the various operations are further illustrated and described with regard to FIGS. 6A-6E. In FIGS. 5A-5E and 6A-6E, only those devices explicitly involved in the operation under explanation are labeled with reference numerals for ease of explanation. It will be understood that elements not labeled with reference numerals in FIGS. 5A-5E are the same as their counterparts in FIG. 2, and that elements not labeled with reference numerals in FIG. 6A-6E are the same as their counterparts in FIG. 3.

The process flow of FIG. 4 produces an additional instance of PTP that is internal to the VSF stack, and distinct from the external instance of PTP that applies to the PTP domain as a whole. The internal instance of PTP is used for internal synchronization (e.g., synchronization among the member devices of the VSF stack). Prior to the process flow of FIG. 4, a user or other device (e.g., a network controller, orchestration engine, etc.) may configure the VSF stack. This may be accomplished by configuring a plurality of member nodes of a network device to function as a single virtual device to external devices, such that the network device includes a primary member node to perform control and management plane operations, and a plurality of secondary nodes that operate under control of the primary member node.

Figure 5A:
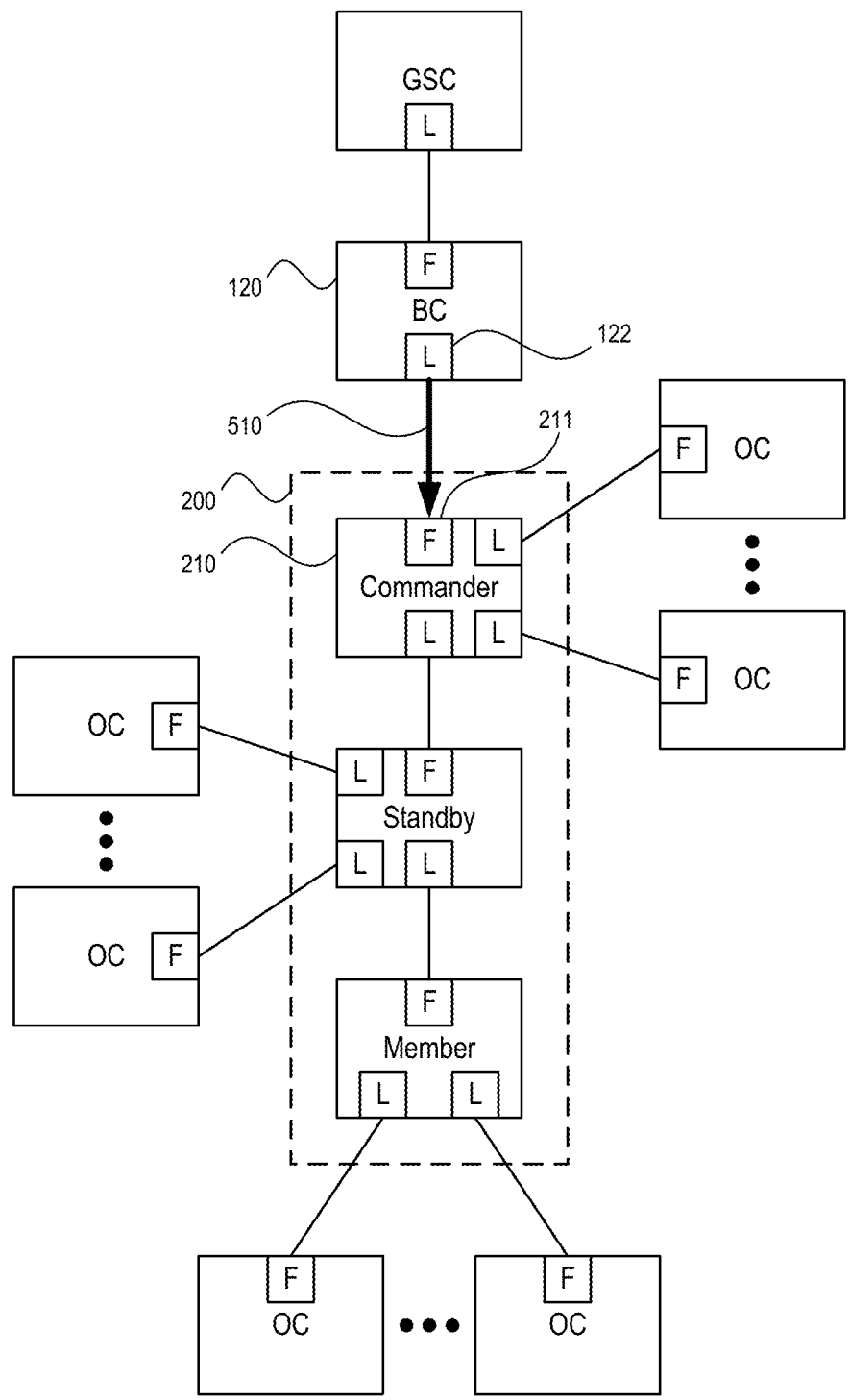
FIG. 5A-5E and 6A-6E respectively illustrate exemplary networks implementing the exemplary operations of FIG. 4.
Figure 6A:
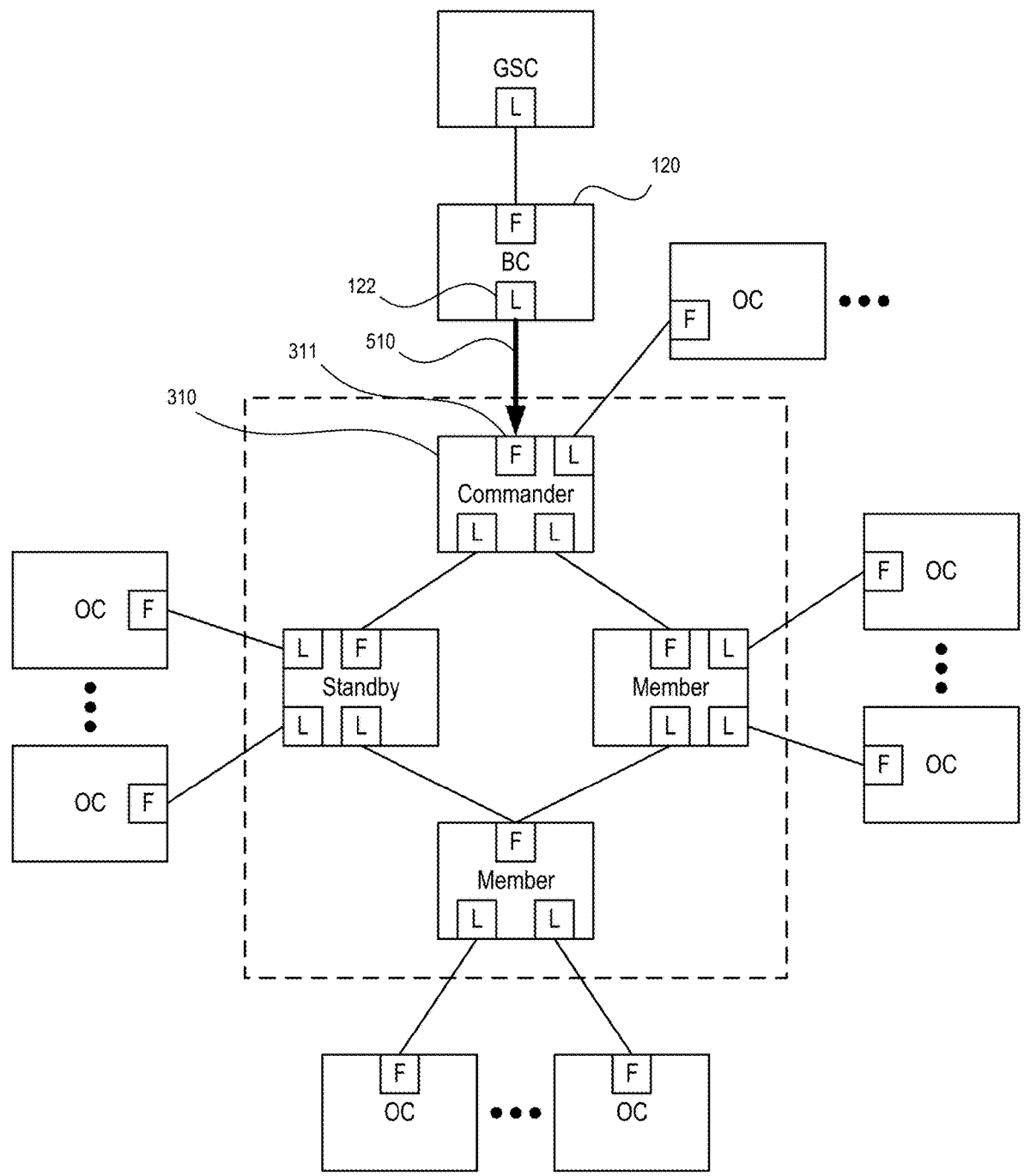

The process flow of FIG. 4 may begin when the upstream device (e.g., the BC 120 in FIG. 2 or 3) transmits a data packet to the VSF stack. Because the data packet originates from a point outside the VSF stack, the data packet may be referred to as a first external data packet. The first external data packet may include a first external timestamp from an external PTP clock (e.g., from the BC 120). Thus, at operation 410, the primary member node receives, at an uplink port thereof, the first external data packet. For example, as illustrated in FIG. 5A, the BC 120 transmits, via the leader port 122, a first external data packet 510 to the follower port 211 of the commander node 210 of the stacked device 200. Alternatively, as illustrated in FIG. 6A, the BC 120 transmits, via the leader port 122, a first external data packet 610 to the follower port 311 of the commander node 310 of the stacked device 300.

Figure 5B:
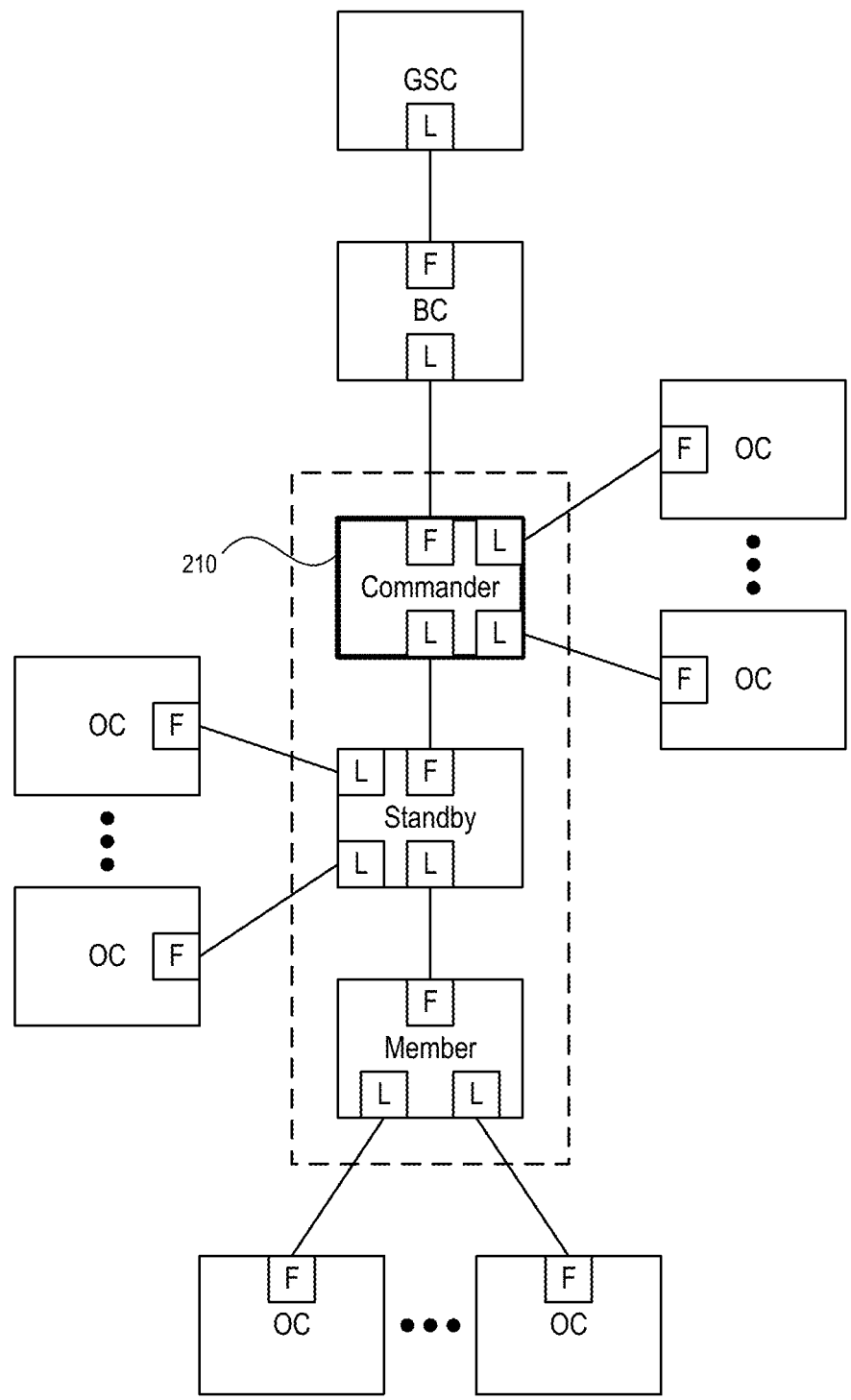
Figure 6B:
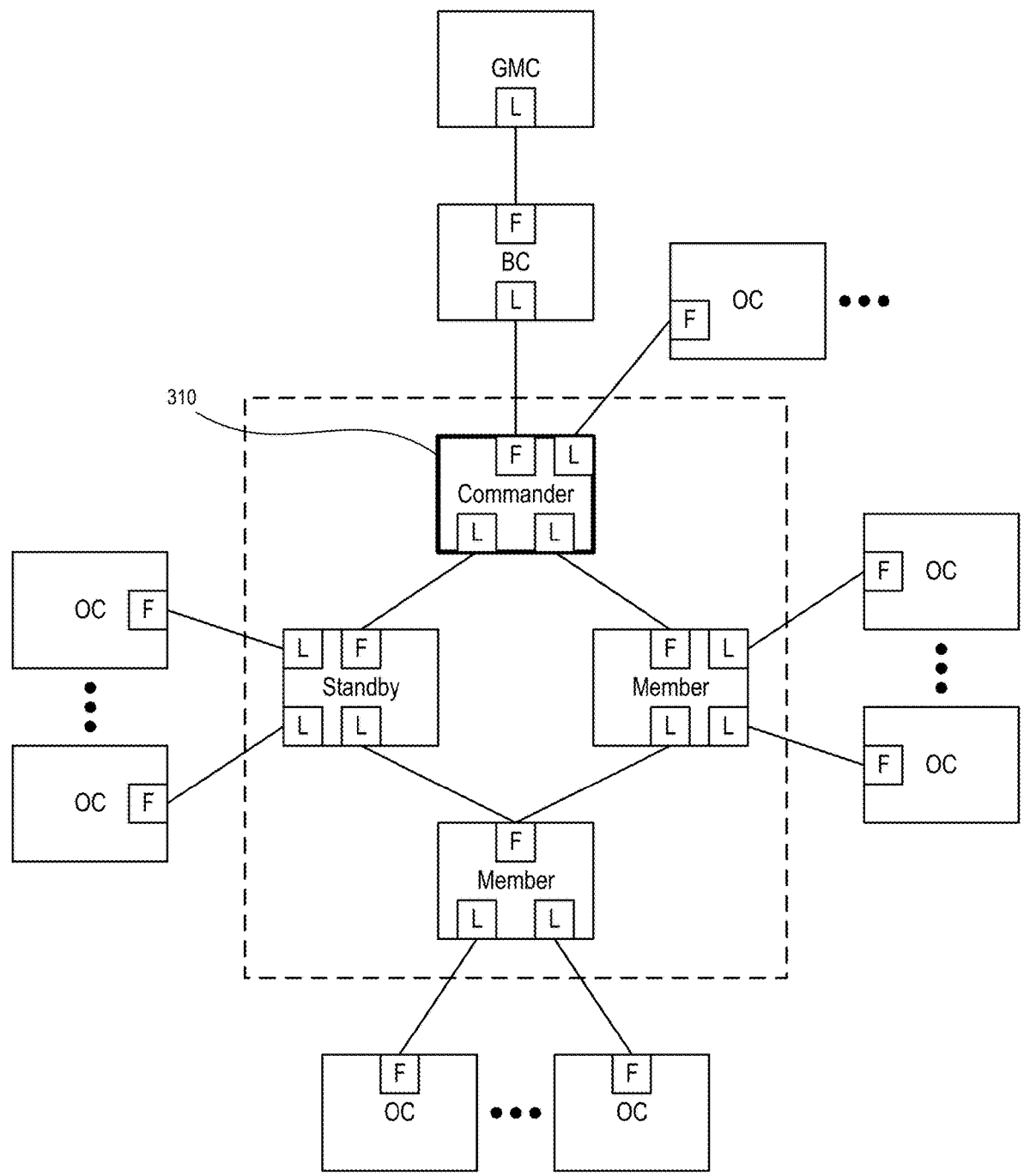
Figure 6C:
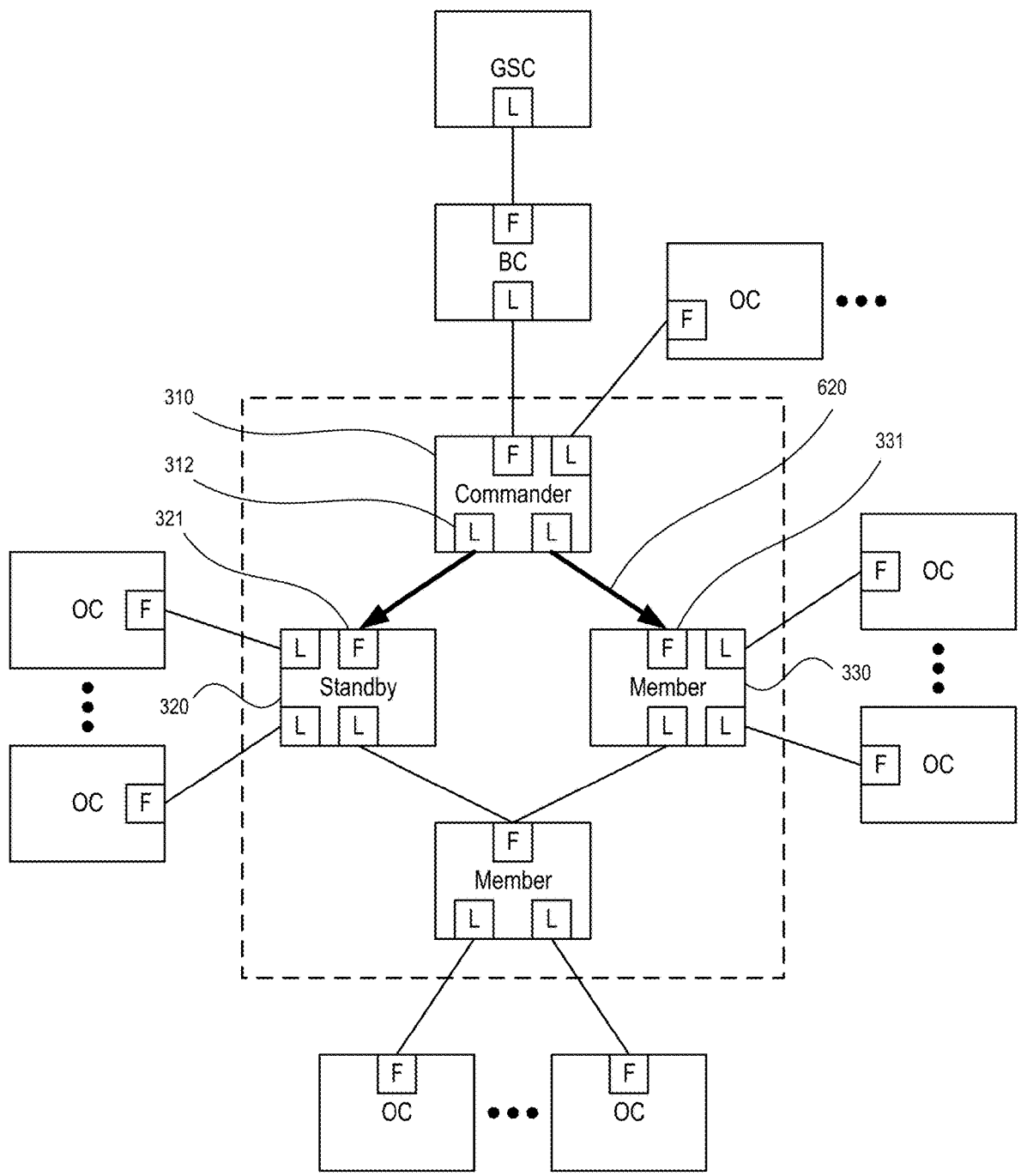

At operation 420, the primary member node synchronizes its clock based on the first external timestamp. For example, as illustrated in FIG. 5B, the commander node 210 consumes the first external data packet 510 and synchronizes the clock of the commander node 210 to the reference time provided by the GSC, as indicated by the timestamp in the first external data packet 510. Alternatively, as illustrated in FIG. 6B, the commander node 310 consumes the first external data packet 610 and synchronizes the clock of the commander node 310 to the reference time provided by the GSC, as indicated by the timestamp in the first external data packet 610. This clock synchronization operation corresponds to the external PTP instance.

Subsequently, the primary member node initiates the internal PTP instance. For example, the primary member node creates, for the VSF stack, one or two PTP clock trees over the stack, starting at the primary member node and extending to each member of the stack. If the VSF stack has a chain topology, the one tree is created which begins at the primary member node and iteratively proceeds to each secondary member node in turn. If the VSF stack has a ring topology, a first ring is created which begins at the primary member node and iteratively proceeds to one half of the N secondary member nodes in one direction of the ring, and a second ring is created which begins at the primary member node and iteratively proceeds to the other half of the N secondary member nodes in the other direction of the ring. If N is odd, the downstream-most secondary member node may be assigned to either tree, and thus each tree may not strictly cover N/2 secondary member nodes. In either topology, all VSF connections from the primary member node down follow a PTP leader-follower relationship. That is, the primary member node's downlink VSF port will be a PTP leader port and the immediate downstream secondary member node's uplink VSF port will be a PTP follower port. Thus, in operation 430 the primary member node may generate a new internal PTP data packet corresponding to the internal PTP instance (i.e., that is local to the VSF stack) and transmit it, via the PTP leader port of the primary node, to the PTP follower port of the secondary member node that is immediately downstream of the primary member node (or, in a ring topology, to the two secondary member nodes that are immediately downstream). The internal PTP data packet may include an internal time stamp based on the clock of the primary member node The downstream secondary member node will then synchronize its clock, based on this internal PTP data packet, with the primary member node acting as an internal-to-the-stack BC. Once the downstream secondary member node has synchronized its own clock, it will repeat the process of generating a new internal PTP data packet and sending it to the next immediate downstream neighbor, and so on until all secondary member nodes have been synchronized with the primary member node's clock. This is illustrated by the loop of operations 440-470 of FIG. 4. The loop of operations 440-470 begins with the topmost secondary member node(s).

Figure 5C:
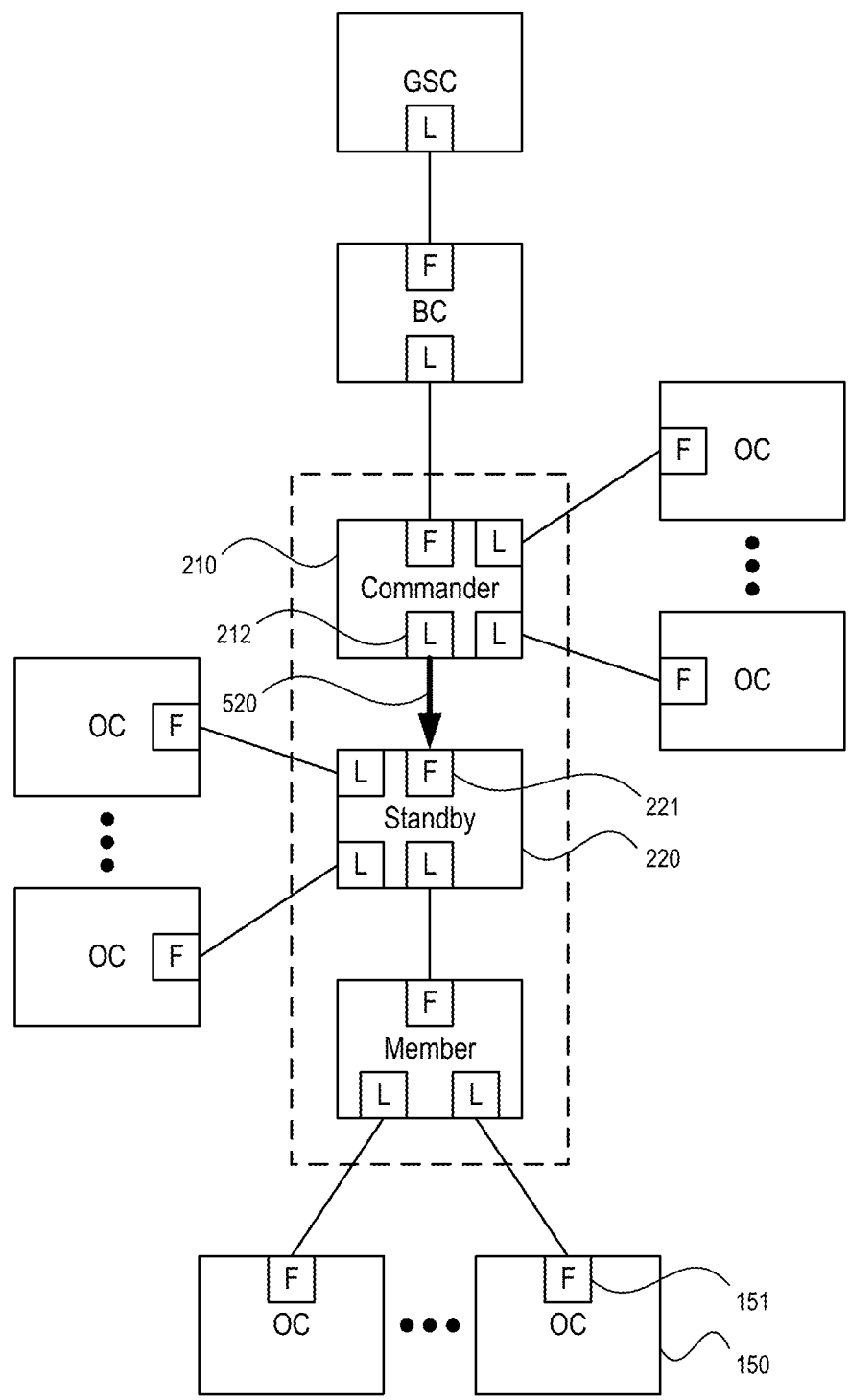

In operation 440, a secondary member node receives, at its uplink port, an internal data packet from the member device immediately upstream from the secondary member node (i.e., the internal PTP data packet generated in step 430 or an internal PTP data packet generated in step 470, described below). The internal data packet includes an internal timestamp based on the clock of the member node immediately upstream of the secondary member node. On the first pass through the loop, the immediately-upstream member node will be the primary member node. For example, as illustrated in FIG. 5C, the commander node 210 transmits, via the leader port 212, an internal data packet 520 to the follower port 221 of the standby node 210 of the stacked device 200. Alternatively, as illustrated in FIG. 6A, the commander node 310 transmits, via the leader ports 312, internal data packets 620 to the follower port 321 of the standby node 320 of the stacked device 300 and to the follower port 331 of the member node 330 of the stacked device 300. On subsequent passes through the loop, the immediately-upstream member node will be a secondary member node. Where the VSF stack implements a ring topology, the loop for one tree (i.e., one direction of the ring) may be performed in parallel with the loop for the other tree (i.e., the other direction of the ring).

Figure 5D:
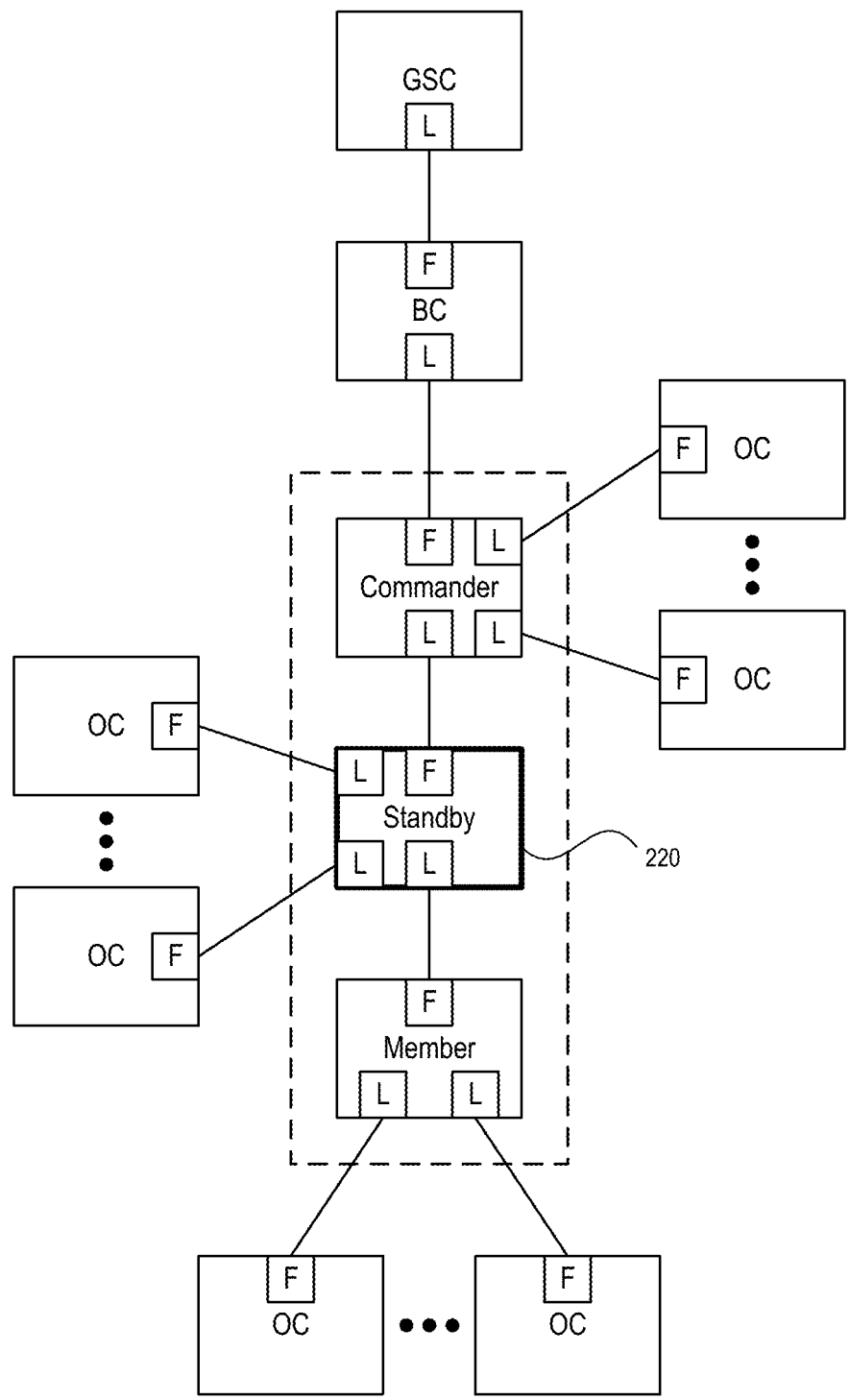
Figure 6D:
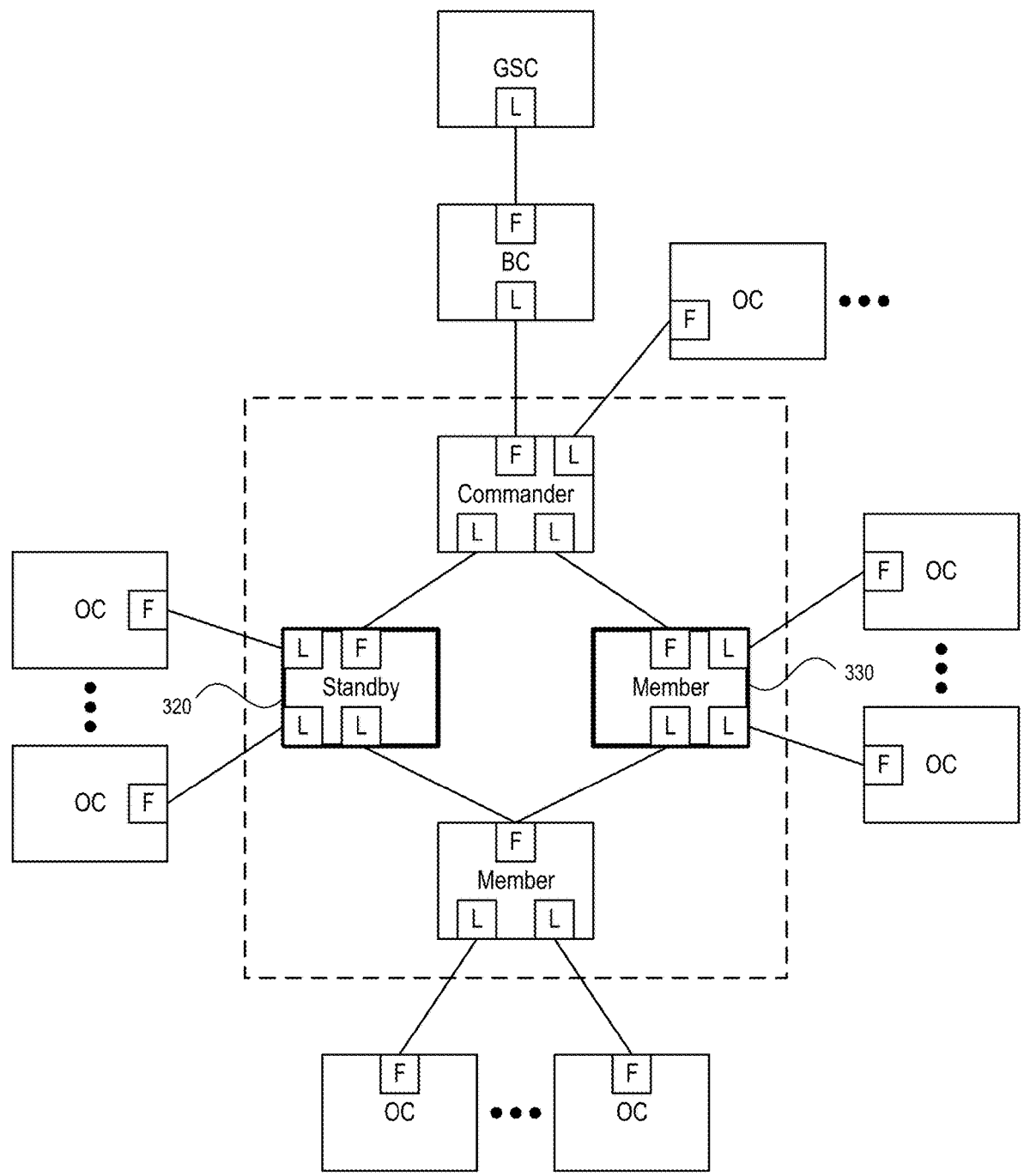

Next, at operation 450, the secondary member node synchronizes its clock based on the internal timestamp. For example, as illustrated in FIG. 5D, the standby node 220 consumes the internal packet 520 and synchronizes the clock of the standby node 220 to the time provided by the commander node 210, as indicated by the timestamp in the internal packet 520. Alternatively, as illustrated in FIG. 6D, the standby node 320 and the member node 330 respectively consume the internal data packets 620 and respectively synchronize their clocks to the time provided by the commander node 310, as indicated by the timestamp in the internal data packets 620. This is an internal PTP instance clock synchronization. At operation 460, the process flow determines whether all secondary member nodes have completed the loop (i.e., whether all secondary member nodes have synchronized their clocks). In some examples, this determination may be made without necessarily needing to poll or track the progress of the other member nodes; for example, the secondary member nodes may be aware of their location within the distribution tree(s) and thus a last node in the tree(s) may automatically know that once it has synchronized itself no further internal PTP messages are needed, and conversely intermediate nodes in the tree may automatically know that they need to send new PTP messages downstream. If operation 460 determines that all secondary member nodes have not completed the loop, the process flow proceeds to operation 470 in which the current secondary node generates a new internal PTP data packet and transmits that packet to the next downstream secondary node. The process then continues to the next secondary member node (i.e. the node to which the data packet was just sent in operation 470) and repeats operations 440-460 for the next secondary member node. The loop will proceed until operation 456 determines that all secondary member nodes have completed the loop, at which point the process flow may determine that the PTP clock tree has reached its end (or ends, in a ring topology). In this manner, the process flow ensures that all member devices have performed a clock synchronization operation.

Figure 7B:
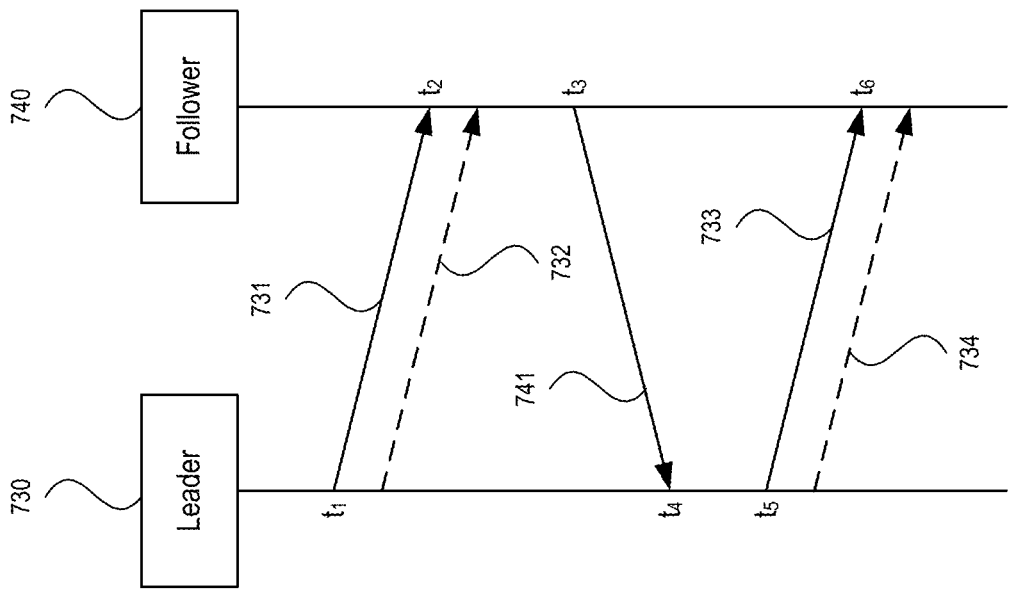
FIGS. 7A-7B respectively illustrate exemplary communication flows for time synchronization in accordance with various aspects of the present disclosure.
Figure 7A:
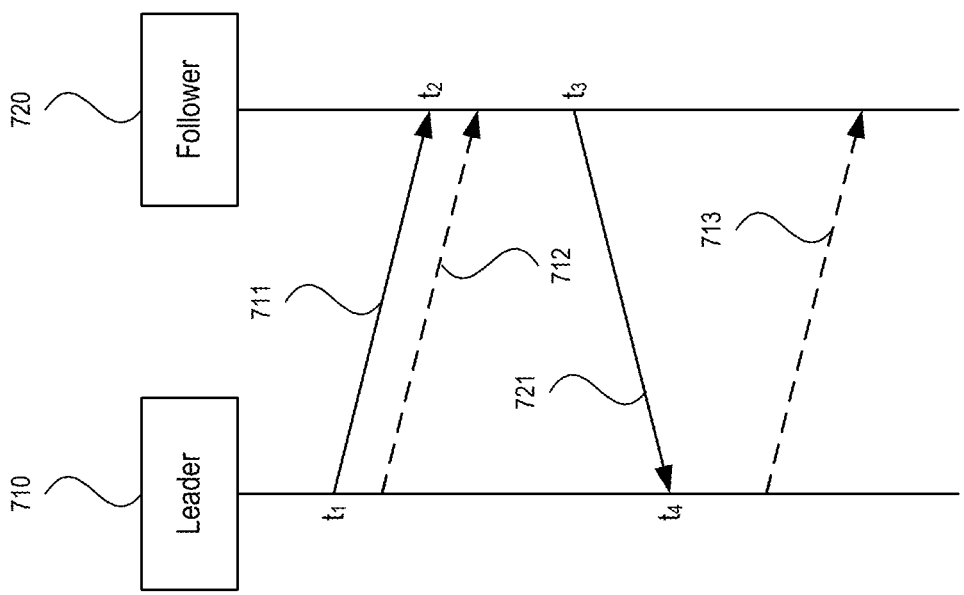

The above synchronization operations within the stack are performed based on the exchanged data packets, whether the synchronization is an external synchronization operation (between an upstream device external to the VSF stack and the primary member node) or an internal synchronization operation (between two devices internal to the VSF stack). The synchronization operations within the VSF stack may be the same as or similar to the synchronization operations performed wholly outside of the VSF stack (e.g., within the GSC 110 and the BC 120 illustrated in FIG. 1). In either case, the device transmitting the data packet may be referred to as the leader device and the device whose clock is being synchronized may be referred to as the follower device. Based on synchronization messages in the exchanged data packets, the follower device calculates the round-trip delay of the path to the leader device. The one-way delay equals half the round-trip delay, under the assumption that the delays in both directions are the same. The follower device then synchronizes its clock with the clock of the leader device according to the offset between the clocks. The synchronization may be performed according to a request-response mechanism as illustrated in FIG. 7A or a peer-delay as illustrated in FIG. 7B. The request-response mechanism may be used for peer-to-peer delay measurement, whereas the peer-delay mechanism may be used for point-to-point delay measurement.

In the request-response mechanism of FIG. 7A, a communication flow is shown over time between a leader device 710 and a follower device 720 in a two-step mode. First, the leader device 710 sends a synchronization message 711 to the follower device 720, and records the sending time $t_1$. Upon receiving the synchronization message 711, the follower device 720 records the receiving time $t_2$. After sending the synchronization message 711, the leader device 710 immediately sends a follow-up message 712 carrying time $t_1$. After receiving the follow-up message 712, the follower device 720 sends a delay-request message 721 to calculate the transmission delay in the reverse direction, and records the sending time $t_3$. Upon receiving the delay-request message 721, the leader device 710 records the receiving time $t_4$. The leader device 710 then sends a delay-response message 713 carrying time $t_4$ to the follower device 720. Upon receipt of the delay-response message 713, the follower device 720 has sufficient information (namely, times $t_1$, $t_2$, $t_3$, and $t_4$) to calculate the round-trip delay. FIG. 7A illustrates a two-step mode. Alternatively, a one-step mode may be utilized in which $t_1$ is instead carried in the synchronization message 711 and the follow-up message 712 is not sent.

In the peer-delay mechanism of FIG. 7B, a communication flow is shown over time between a leader device 730 and a follower device 740 in a two-step mode. First, the leader device 730 sends a synchronization message 731 to the follower device 740, and records the sending time $t_1$. Upon receiving the synchronization message 731, the follower device 740 records the receiving time $t_2$. After sending the synchronization message 731, the leader device 730 immediately sends a follow-up message 732 carrying time $t_1$. After receiving the follow-up message 732, the follower device 740 sends a peer-delay-request message 741 to calculate the transmission delay in the reverse direction, and records the sending time $t_3$. Upon receiving the peer-delay-request message 741, the leader device 720 records the receiving time $t_4$. The leader device 730 then sends a peer-delay-response message 743 carrying time $t_4$ to the follower device 740, and records the sending time $t_5$. Upon receiving the peer-delay-response message 743, the follower device 740 records the receiving time $t_6$. After sending the peer-delay-response message 733, the leader device 730 immediately sends a peer-delay-response-follow-up message 734 carrying time $t_5$. Upon receipt of the peer-delay-response-follow-up message 734, the follower device 740 has sufficient information (namely, times $t_1$, $t_2$, $t_3$, $t_4$, $t_5$, and $t_6$) to calculate the round-trip delay. FIG. 7A illustrates a two-step mode. Alternatively, a one-step mode may be utilized in which $t_1$ is instead carried in the synchronization message 711 and the follow-up message 712 is not sent, and in which the offset between $t_4$ and $t_5$ is instead carried in the peer-delay-response-message 733 and the peer-delay-response-follow-up message 734 is not sent.

Each synchronization operation within the loop by the VSF stack may be performed independently, thereby to improve accuracy of the synchronization process. The internal PTP instance will run on each member device of the VSF stack. Within the VSF stack, the member devices use their internal unique member number (e.g., a local MAC or stack-local IP) in PTP packets because each member device of the PTP stack is a unique PTP clock entity.

Returning to FIG. 4, once the loop has terminated, all synchronization operations within the internal PTP instance have been completed, and all secondary member nodes have been clock-synchronized to the primary member node, the VSF stack may begin propagating timestamps to downstream network devices, such as the OCs and/or any downstream BCs. Thus, the process flow proceeds to operation 470. In operation 470, all member devices which have downstream external network devices connected thereto (i.e., the primary member node and/or respective ones of the plurality of second member nodes) transmit, from respective downlink ports of the member devices, a corresponding number of second external data packets. The number of second external data packets will be equal to the number of downstream external network devices. The second external data packets may respectively include second external timestamps based on the synchronized clock of the transmitting member node.

Figure 5E:
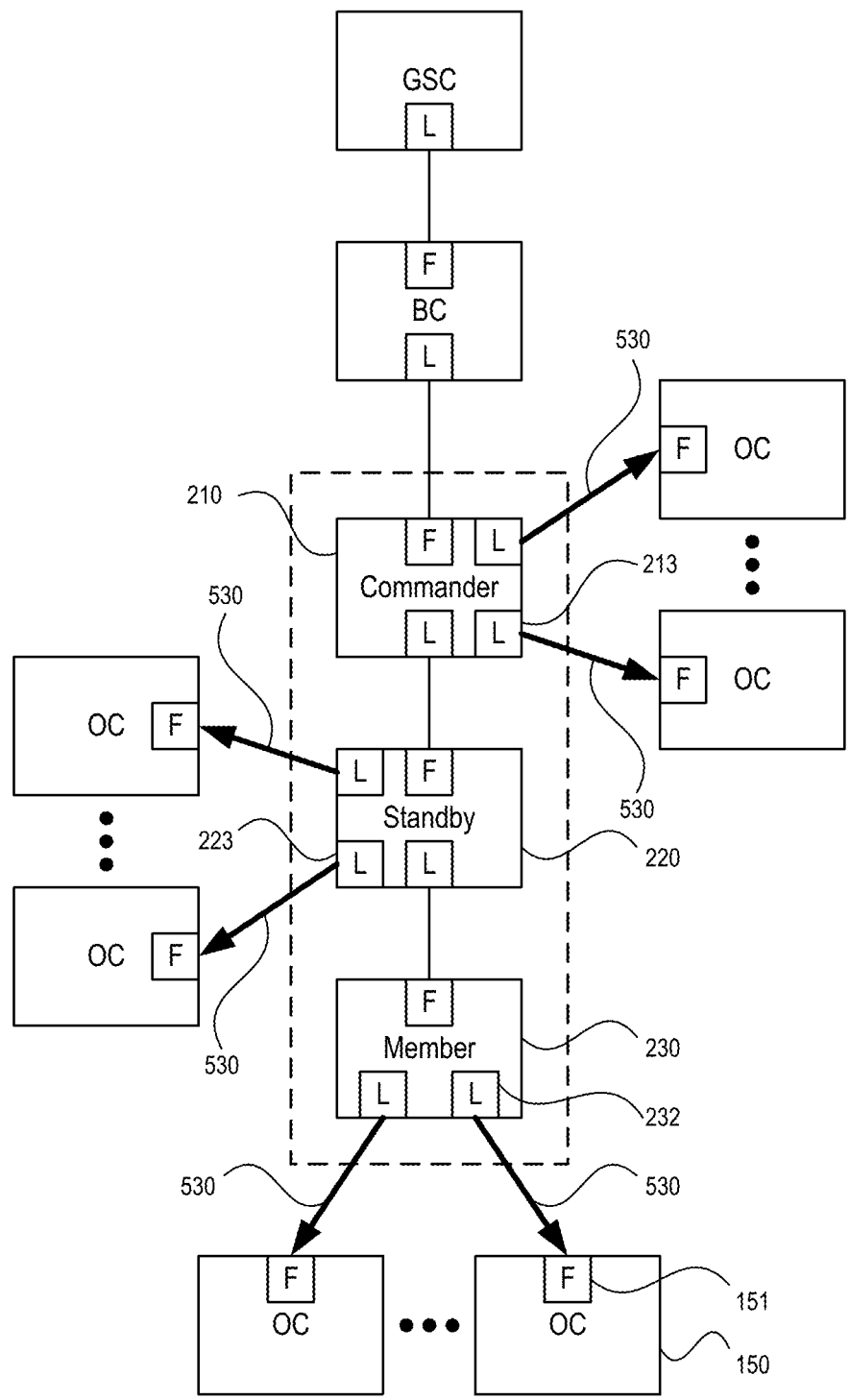
Figure 6E:
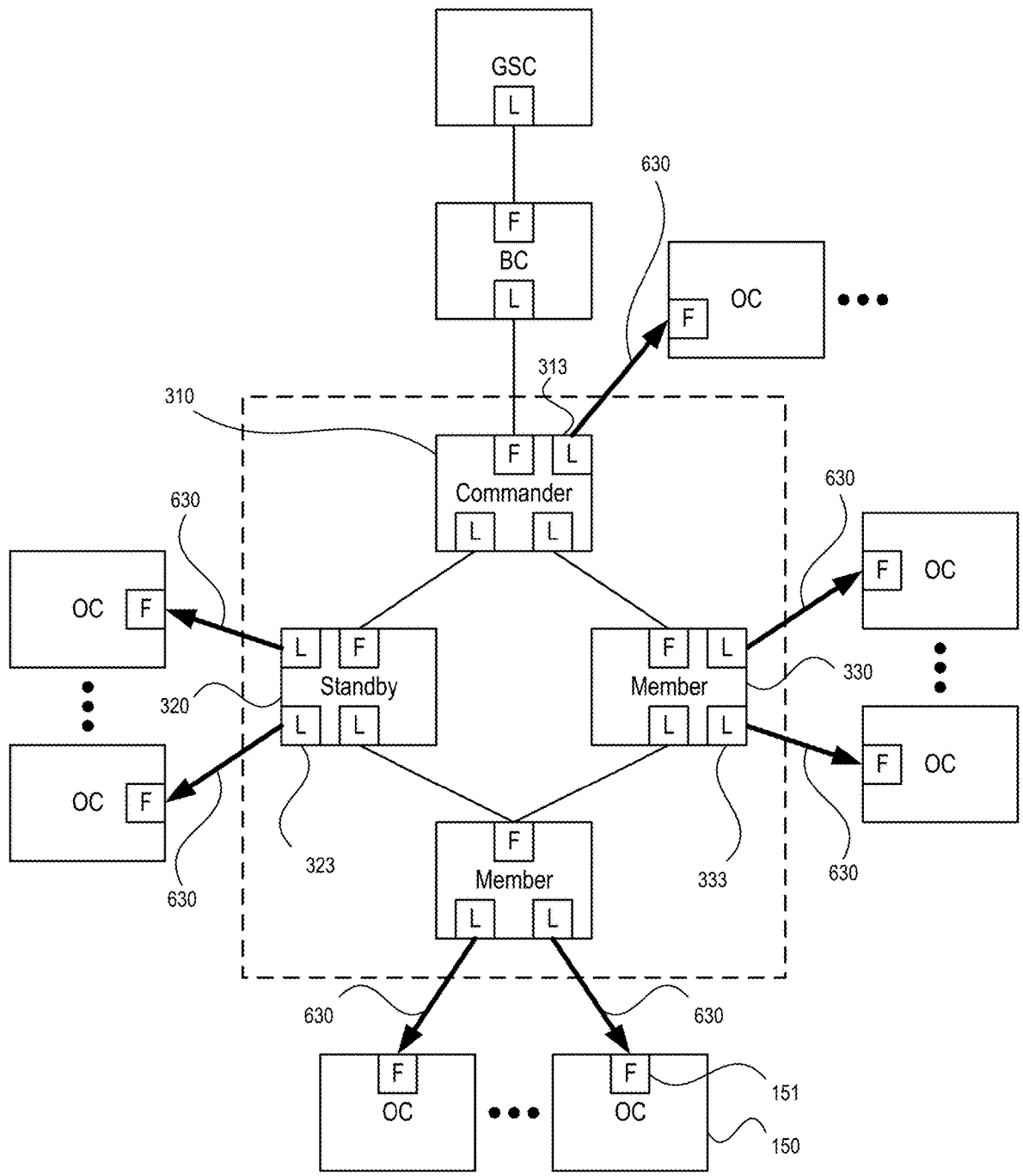

For example, as illustrated in FIG. 5E, the commander node 210 transmits, via its external leader ports 213, second external data packets 530 to the follower ports 151 of all OCs 150 connected to the commander node 210; the standby node 220 transmits, via its external leader ports 223, second external data packets 530 to the follower ports 151 of all OCs 150 connected to the standby node 220; and the member node 230 transmits, via its external leader ports 232, second external data packets 530 to the follower ports of all OCs 150 connected to the member node 230. Alternatively, as illustrated in FIG. 6E, the commander node 310 transmits, via its external leader ports 313, second external data packets 630 to the follower ports 151 of all OCs 150 connected to the commander node 310; the standby node 320 transmits, via its external leader ports 323, second external data packets 630 to the follower ports of all OCs 150 connected to the standby node 220; and the member nodes 330 transmit, via their external leader ports 333, second external data packets 630 to the follower ports 151 of all OCs 150 connected to the member nodes 330.

Thus, for the OCs 150 connected to each member device in the stacked device 200 or 300, the external PTP instance runs on each member device. The member device functions as if it were a BC and uses its local clock as a reference when generating PTP frames from its local ports. When the client sends a P2P or peer-delay measurement packet, the member device handles it locally and needs not send an internal PTP packet to the primary member node. The external PTP instance will use the MAC/IP address of the stacked device 200 or 300 itself, and thus the respective second external data packets include an address corresponding to the stacked device as a whole, so that it appears that the PTP frames are sourced by the stacked device 200 or 300 rather than any individual member device. As such, the operations of FIG. 4 allow a stacked network device to operate as a BC of a network operating according to PTP.

In other examples (not illustrated), rather than waiting until all secondary member nodes have completed their synchronization before any member nodes sent external PTP data packets to their respectively connected OCs 150 or other external downstream devices, each individual node within the stacked device 200 or 300 may begin sending external PTP data packets to its own connected OCs 150 or other external downstream devices once that particular node has completed its own synchronization. Nodes that have not yet been synchronized may wait until they are synchronized before they begin sending external PTP data packets. Thus, in these examples, OCs 150 may receive external PTP data packets from the stacked device at different timings depending on which particular node the OCs 150 are coupled to.

Figure 8:
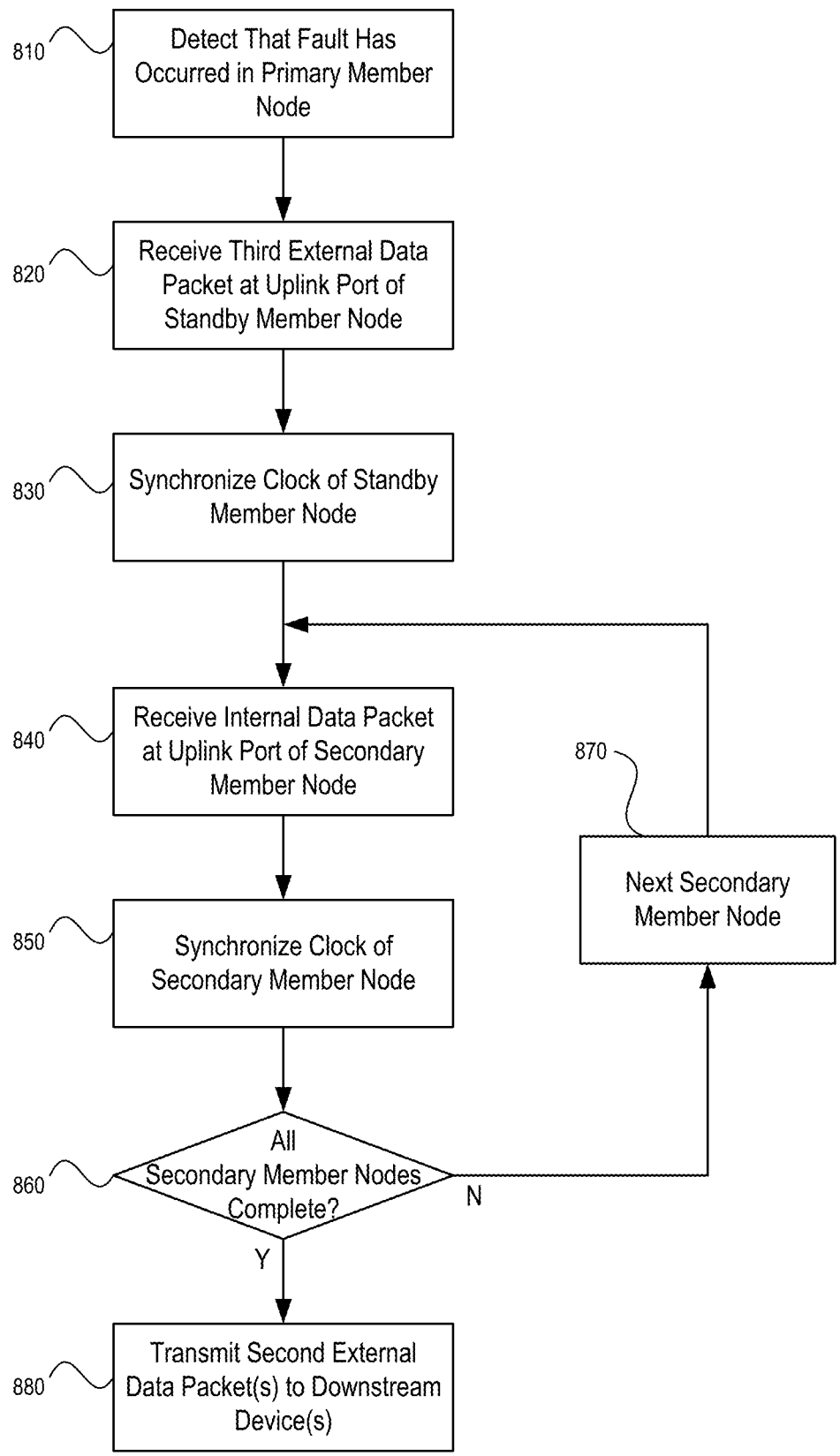
FIG. 8 illustrates another exemplary process flow for time propagation and synchronization in accordance with various aspects of the present disclosure.
Figure 9A:
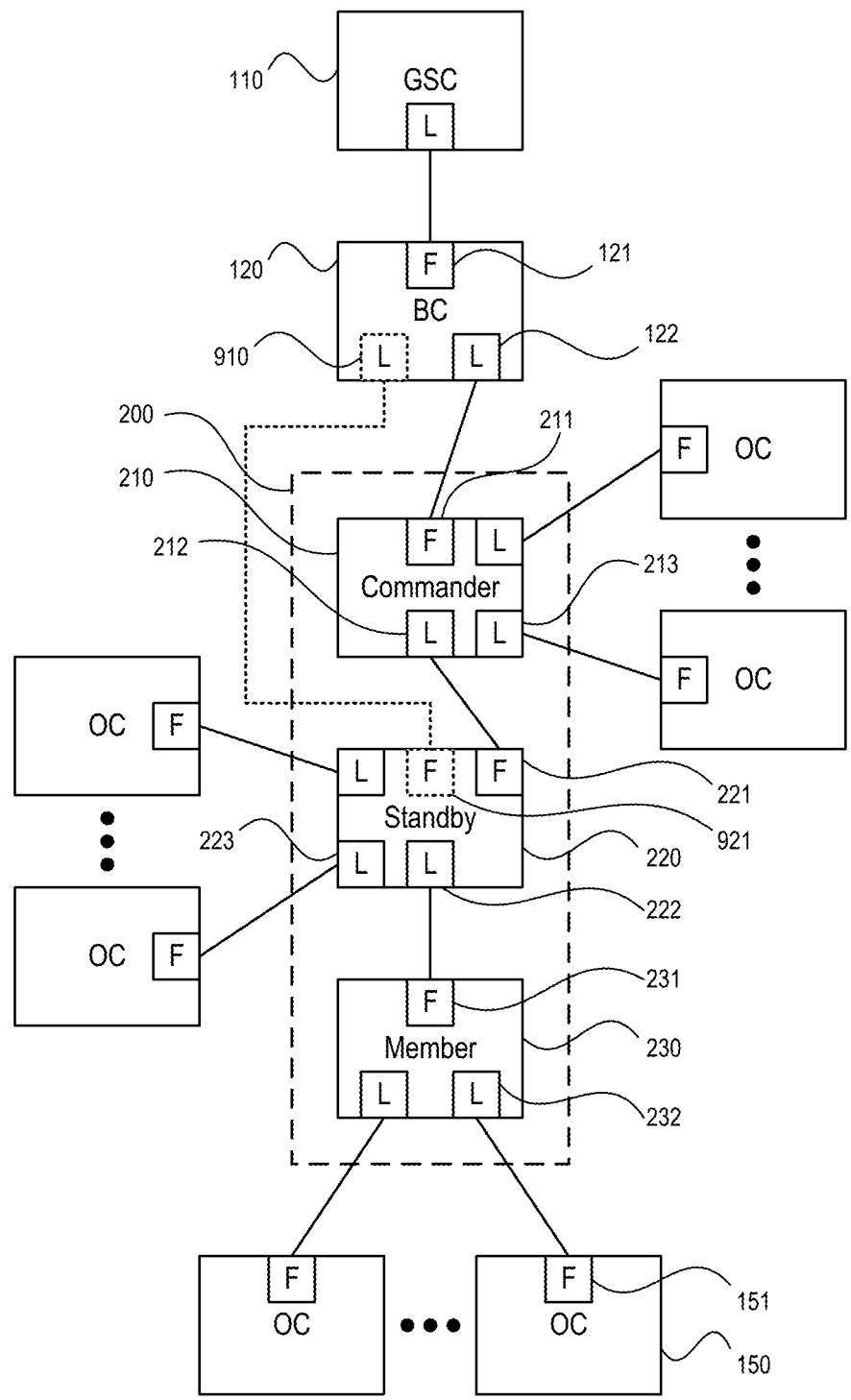
FIGS. 9A-9C respectively illustrate an exemplary network implementing the exemplary operations of FIG. 8.
Figure 9B:
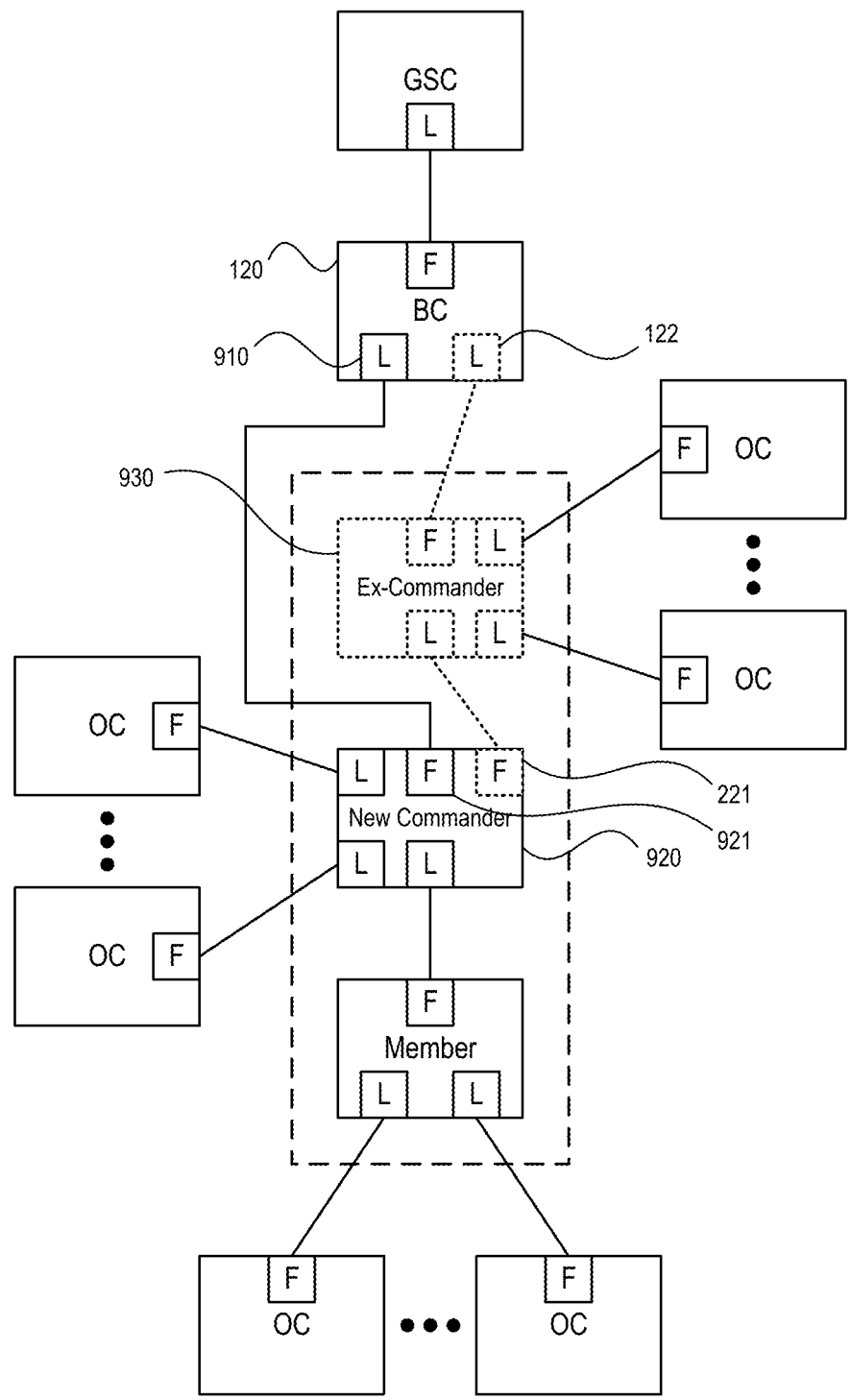
Figure 9C:
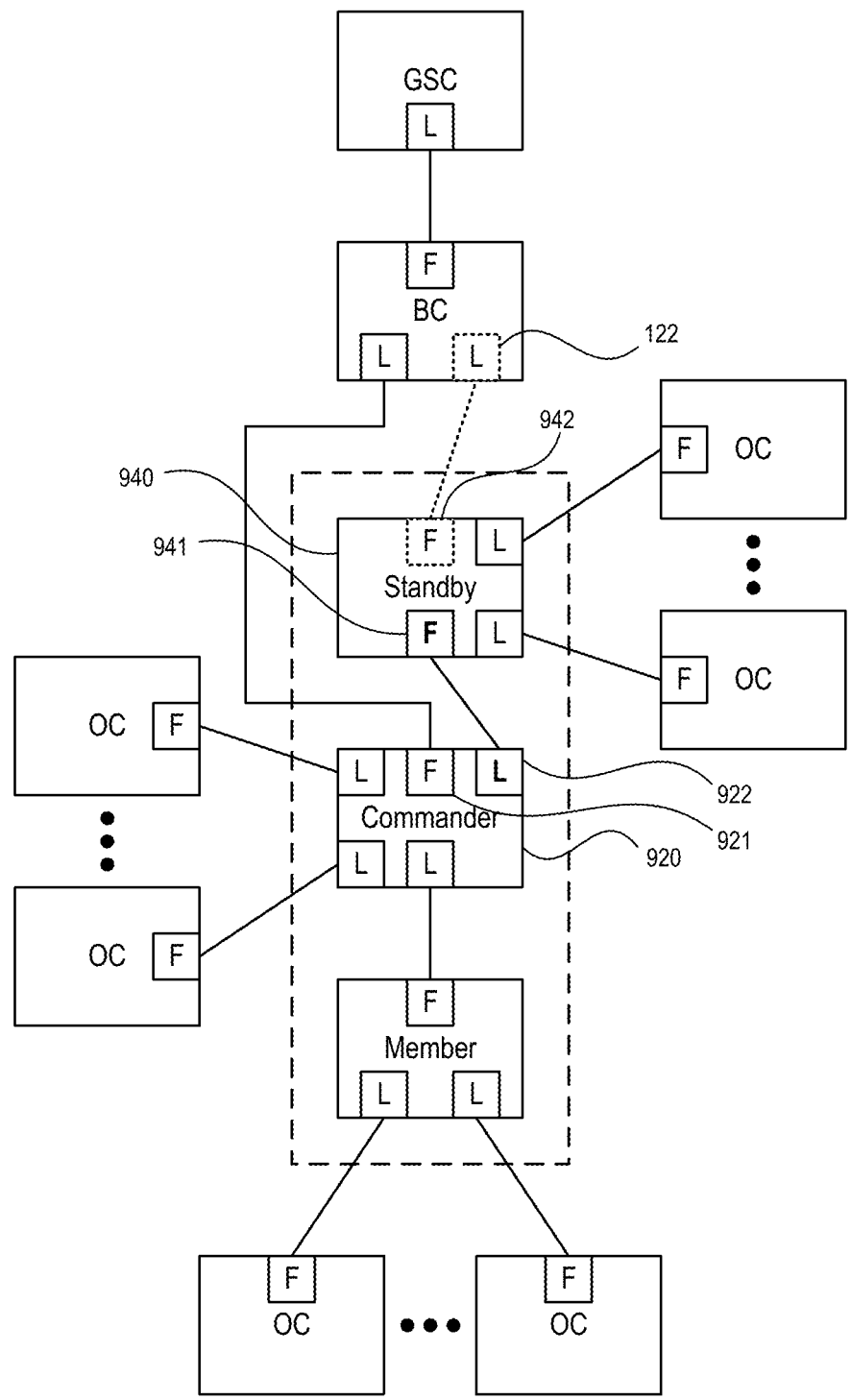

As noted above, VSF permits a member device in a stacked network device to be designated as a standby node to perform control operations in the event that the commander node becomes unavailable. FIG. 8 illustrates an exemplary process flow for time propagation and synchronization in such an event. An example of the operations illustrated in FIG. 8 is further shown and described with regard to FIGS. 9A-9C, in which the VSF stack utilizes a chain topology, such as the chain-connected stacked device 200 illustrated in FIG. 2. However, it should be understood that the operations of FIG. 8 may also be implemented in a VSF stack which utilizes a ring topology, such as the ring-connected stacked device 300 illustrated in FIG. 3. In FIGS. 9A-9C, only those devices explicitly involved in the operation under explanation are labeled with reference numerals for ease of explanation. It will be understood that elements not labeled with reference numerals in FIGS. 9A-9C are the same as their counterparts in FIG. 2. Moreover, for purposes of explanation, the operations of FIG. 8 will be described as being performed by the standby node 320 as an example of a device that has been designated to perform control operations in the event that the primary member node becomes unavailable.

Prior to operation 810, the PTP domain may have the configuration illustrated in FIG. 9A. FIG. 9A is similar to the configuration illustrated in FIG. 2, except that the BC 120 includes an additional downlink port, referred to as a standby leader port 910, and that the standby node 220 includes an additional uplink port, referred to as a standby follower port 921. The standby follower port 921 may be a LAG port or dual ROPs. The standby leader port 910 and the standby follower port 921 are connected to one another via a link that may remain inactive for as long as the commander node 210 remains functional. Where the standby follower port 921 and the follower port 211 are LAG ports, the connection between the BC 120 and the commander node 210 may be configured as the "primary" link on both the stacked device 200 and the BC 120 so that PTP packets transmitted by the BC 120 directly reach the commander node 210 and not the standby node 220 at this point. Where the standby follower port 921 and the follower port 211 are ROPs, the internal PTP instance may choose the connection between the BC 120 and the commander node 210 as the higher priority link (as compared to the connection between the BC 120 and the standby node 220).

At operation 810, the process flow detects that a fault has occurred in the primary member node (e.g., the commander node 210). For example, if the primary member node crashes or fails, the connection between the GSC and the primary member node and the connection between the primary member node and the standby member node may become incapable of carrying data packets. Subsequently, the standby node (i.e., the secondary member node which has previously been designated as the standby member node in case of a fault in the primary member node) will act as the primary member node of the VSF stack. This may be accomplished by promoting the standby member node such that it performs the operations previously performed by the primary member node, including but not limited to operations similar to those illustrated in FIG. 4. As illustrated in FIG. 8, these operations include, after the fault detection, operation 820 in which the standby member node, at an uplink port thereof, begins receiving third external data packets which, having been transmitted from the same GSC, include the first external timestamp. At operation 830, the standby member node synchronizes its clock based on the first external timestamp. This is an external PTP instance clock synchronization.

Now, it is the standby member node which conducts the internal PTP instance. For example, the standby member node creates, for the VSF stack, one or two PTP clock trees over the stack, starting at the primary member node and extending to each member of the stack except for the now-unavailable primary member node. If the VSF stack has a chain topology, the one tree is created which begins at the standby member node and iteratively proceeds to each secondary member node (excepting the standby member node) in turn. If the VSF stack has a ring topology, a first ring is created which begins at the standby member node and iteratively proceeds to one half of the N secondary member nodes in one direction of the ring, and a second ring is created which begins at the standby member node and iteratively proceeds to the other half of the N secondary member nodes in the other direction of the ring. If N is odd, the downstream-most secondary member node may be assigned to either tree, and thus each tree may not strictly cover N/2 secondary member nodes. In either topology, all VSF connections from the standby member node down follow a PTP leader-follower relationship. That is, the standby member node's downlink VSF port will be a PTP leader port and the immediate downstream secondary member node's uplink VSF port will be a PTP follower port. The standby member node may cause the downstream secondary member node to synchronize its clock with the standby member node acting as an internal-to-the-stack BC. Once the downstream secondary member node has synchronized its own clock, it will repeat the process with its immediate downstream neighbor, and so on until all secondary member nodes have been synchronized with the standby member node's clock. This is illustrated by the loop of operations 840-870 of FIG. 8. The loop of operations 840-870 begins with the secondary member node immediately below the standby member node.

In operation 840, a secondary member node receives, at its uplink port, an internal data packet from the member device immediately upstream from the secondary member node. The internal data packet includes an internal timestamp based on the clock of the member node immediately upstream of the secondary member node. On the first pass through the loop, the immediately-upstream member node will be the standby member node. On subsequent passes through the loop, the immediately-upstream member node will be another secondary member node. Where the VSF stack implements a ring topology, the loop for one tree (i.e., one direction of the ring) may be performed in parallel with the loop for the other tree (i.e., the other direction of the ring. Next, at operation 850, the secondary member node synchronizes its clock based on the internal timestamp. This is an internal PTP instance clock synchronization. At operation 860, the process flow determines whether all secondary member nodes have completed the loop (i.e., whether all secondary member nodes have synchronized their clocks). If operation 860 determines that all secondary member nodes have not completed the loop, the process flow proceeds at operation 870 to the next secondary member node and repeats operations 840-860 for the next secondary member node. The loop will proceed until operation 860 determines that all secondary member nodes have completed the loop, at which point the process flow may determine that the PTP clock tree has reached its end (or ends, in a ring topology). In this manner, the process flow ensures that all member devices have performed a clock synchronization operation.

Once the loop has terminated, all synchronization operations within the internal PTP instance have been completed, and all secondary member nodes have been clock-synchronized to the standby member node, the VSF stack may begin propagating timestamps to downstream network devices, such as the OCs and/or any downstream BCs. Thus, the process flow proceeds to operation 880. In operation 880, all member devices which have downstream external network devices connected thereto (i.e., the standby member node and/or respective ones of the remaining second member nodes) transmit, from respective downlink ports of the member devices, a corresponding number of second external data packets. The number of second external data packets will be equal to the number of downstream external network devices. The second external data packets may respectively include second external timestamps based on the synchronized clock of the transmitting member node.

As an example, FIG. 9B illustrates a configuration of the PTP domain during operations 810-880; that is, after the primary member node has failed. In FIG. 9B, the member device that was previously operating as the primary member node, now referred to as the ex-commander node 930, has failed. As a result, its link to the leader port 122 of the BC 120 and to the follower port 221 of the standby node 220 are nonfunctional. The fault having been detected, the standby node 220 becomes the new commander node 920. The link between the standby leader port 910 of the BC 120 and the standby follower port 921 of the new commander node 920 is active.

At some later point, the primary member node may become available (e.g., it may reboot and come back online). The VSF stack may detect that the fault in the primary member node has been resolved, and subsequently permit the primary member node to rejoin the VSF stack without giving control back to the primary member node. Thus, subsequent to the detection, the primary member node may receive, at its uplink port, an internal data packet from the member node immediately upstream of the primary member node according to the revised tree. The internal data packet includes an internal timestamp based on the clock of the member device immediately upstream of the primary member node. The primary member node may then synchronize its clock based on the internal timestamp. After the primary member node and all secondary member nodes have synchronized their clocks, the primary member node may transmit, from its downlink port to the external network devices connected thereto, the second external data packets.

An exemplary configuration of the PTP domain after the ex-commander has returned to service is illustrated in FIG. 9C. At this point, the ex-commander node 930 may become a new standby node 940. In such a case, it will not synchronize its time directly from the GSC 110 and/or BC 120, even though it has a connectivity link to it, but will resynchronize with the new commander node 920 of the stacked device 200. The resynchronization may be direct if the new standby node 940 is directly connected to the new commander node 920, or transitive if the new standby node 940 is connected to the new commander node 920 through an intermediate device. Once the new standby node 940 has been clock-synchronized to the new commander node 920, the PTP clock trees within the stacked network device 200 may be reconstructed as before with no impact on the downstream endpoints (e.g., OCs 150).

Figure 10A:
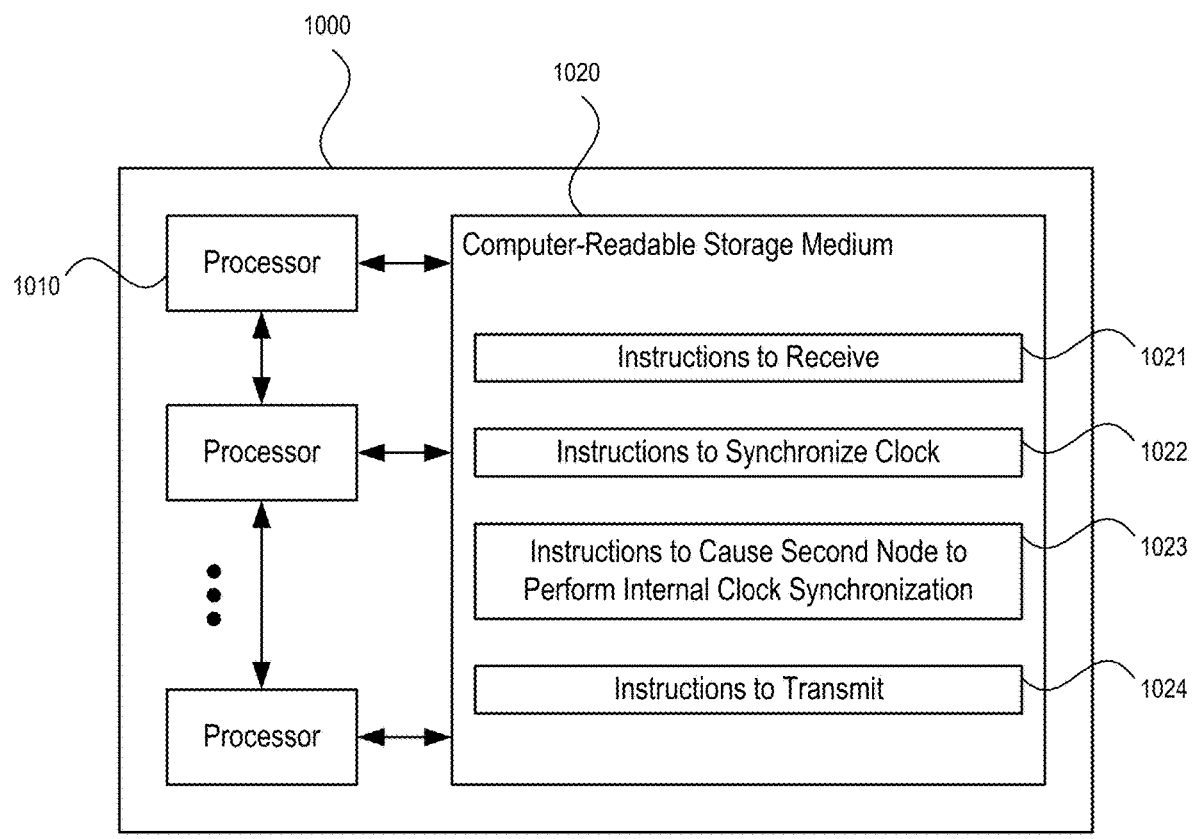
FIGS. 10A-10B illustrate an exemplary processing system in accordance with various aspects of the present disclosure.
Figure 10B:
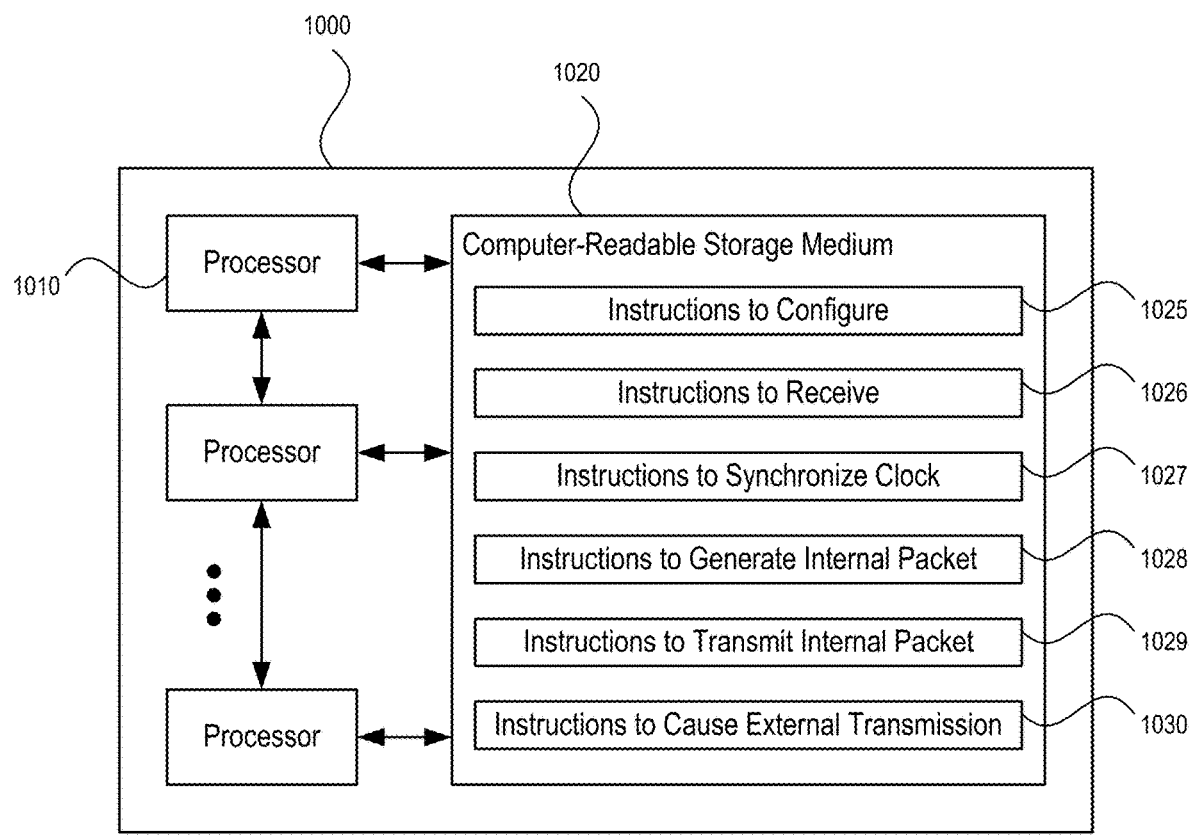

The exemplary systems and methods described herein may be performed under the control of a processing system executing computer-readable codes embodied on a non-transitory computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. In accordance with the present disclosure, a non-transitory computer-readable medium may store instructions that, when executed by an electronic processor (e.g., an electronic processor of any of the above-described devices), cause the performance of the operations described herein. FIGS. 10A-10B illustrate an exemplary processing system 1000 in accordance with the present disclosure. FIGS. 10A-10B are illustrated separately solely for convenience and ease of explanation, and in some implementations FIGS. 10A-10B may simply show different aspects of the same exemplary processing system 1000.

The processing system 1000 may correspond to any one or more of the above-described network devices, including but not the stacked device 200 illustrated in FIG. 2 or the stacked device 300 illustrated in FIG. 3. In some examples, the processing system 1000 may correspond to one or more of the nodes within any one of the above-described network devices (e.g., to the commander node 210 of FIGS. 2 and 9A, the standby node 220 of FIGS. 2 and 9A, the commander node 310 of FIG. 3, the standby node 320 of FIG. 3, the new commander node 920 of FIGS. 9B-9C, and/or the new standby node 940 of FIG. 9C).

As shown in FIGS. 10A-10B, the processing system 1000 includes at least one processor 1010 (as illustrated, three) operatively connected to a memory implemented as a computer-readable storage medium 1020. The at least one processor 1010 may be or include one or more electronic processing cores operatively connected to one another and configured to execute instructions stored in the computer-readable storage medium 1020. Different processors 1010 may be included in the same network device or distributed across different network devices. For example, a first processor 1010 may be included in a first member node (e.g., a commander node) and a second processor 1010 may be included in a second member node (e.g. a standby node and/or another member node). The computer-readable storage medium 1020 may be implemented as several different media included in the same network device or distributed across different network devices. The computer-readable storage medium 1020 may be a non-transitory computer-readable medium or distributed media storing instructions that, when executed by the at least one processor 1010 or a subset thereof, cause the processing system 1000 to perform various operations.

In the example of FIG. 10A, the instructions include instructions to receive 1021 (e.g., instructions to cause a first member node to receive a first external data packet at the PTP follower port of the first member node), instructions to synchronize a clock 1022 (e.g., instructions to cause the first member node to synchronize the clock of the first member node using a PTP timestamp included in the first external data packet), instructions to cause second nodes to perform an internal clock synchronization 1023 (e.g., instructions to cause each second node to receive, at the PTP follower port of the respective second member node, an internal data packet from the PTP leader port of a member node immediately upstream of the respective second member node, wherein the internal data packet includes an internal PTP timestamp based on the clock of the member node immediately upstream of the respective second member node, and synchronize a clock of the respective second member node based on the internal timestamp of the internal data packet), and instructions to transmit 1024 (e.g., instructions to, after the internal clock synchronization, cause the network device 1000 to transmit, from the respective PTP leader ports of the first member node and/or respective ones of the plurality of second member nodes to a plurality of downstream devices, a corresponding number of second external data packets).

In the example of FIG. 10B, the instructions include instructions to configure 1025 (e.g., instructions to cause a primary member node configure a plurality of member nodes of a stacked network device to function as a single virtual device to external devices, wherein the plurality of member nodes includes the primary member node and a plurality of secondary member nodes interconnected by member links to exchange data plane traffic, the primary member node being configured to perform control and management plane operations on behalf of the stacked network device), instructions to receive 1026 (e.g., instructions to cause the primary member node, at an uplink port of the primary member node, a first external PTP data packet including a first external timestamp from an external clock device operating according to an external PTP domain), instructions to synchronize clock 1027 (e.g., instructions to cause the primary member node to synchronize a clock of the primary member node based on the first external timestamp), instructions to generate an internal packet 1028 (e.g., instructions to cause the primary member node to generate an internal PTP data packet according to an internal instance of PTP that is local to the first stacked network device, the internal PTP data packet including an internal time stamp based on the clock of the primary member node), instructions to transmit the internal packet 1029 (e.g., instructions to cause the primary member node to transmit the internal data packet from a downlink port of the primary member node to an uplink port of the secondary member node immediately downstream of the primary member node), and instructions to cause an external transmission 1030 (e.g., instructions to cause the primary member node to cause a transmission, from one or more downlink ports of the primary member node and/or respective ones of the plurality of secondary member nodes to one or more downstream external devices, of a corresponding number of second external data packets, wherein the second external data packets respectively include a second external timestamp based on the synchronized clock of the primary member node). As noted above, a single instance of the computer-readable storage medium 1020 may include each of instructions 1021-1030.

Examples of the computer-readable recording medium 1020 include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium 1020 may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many example implementations and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future example implementations. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various example implementations for the purpose of streamlining the disclosure. This method of disclosure is not to be interpreted as reflecting an intention that the claimed example implementations require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A stacked network device comprising:
   a first member node configured to perform control and management plane operations on behalf of the stacked network device, the first member node including a first clock, a Precision Time Protocol (PTP) follower port, and at least one PTP leader port; and
   a plurality of second member nodes, respective ones of the plurality of second member nodes including a clock, a PTP follower port, and a PTP leader port,
   wherein the first member node is configured:
      to receive a first external data packet at the PTP follower port of the first member node,
      to synchronize the clock of the first member node using a PTP timestamp included in the first external data packet, and
      to cause each of the plurality of second member nodes to perform a first internal clock synchronization operation, the first internal clock synchronization including:
         receiving, at the PTP follower port of the respective second member node, an internal data packet from the PTP leader port of a member node immediately upstream of the respective second member node, wherein the internal data packet includes an internal PTP timestamp based on the clock of the member node immediately upstream of the respective second member node, and
         synchronizing a clock of the respective second member node based on the internal timestamp of the internal data packet,
   wherein, after the first internal clock synchronization operation, the network device is configured to transmit, from the respective PTP leader ports of the first member node and/or respective ones of the plurality of second member nodes to a plurality of downstream devices, a corresponding number of second external data packets, and
   wherein the second external data packets respectively include a second external timestamp based on the synchronized clock of the transmitting member node.

2. The network device of claim 1, wherein the network device is configured to function as a single virtual device to external network devices in the network.

3. The network device of claim 1, wherein the network device is configured to operate as a boundary clock device of a network operating according to PTP.

4. The network device of claim 1, wherein the PTP follower port of the first member node is a Link Aggregation Group (LAG) port or dual Routed Only Ports (ROPs).

5. The network device of claim 1, wherein a standby member node of the plurality of second member nodes is configured:
   to detect that a fault has occurred in the first member node; and
   subsequently:
      to receive a third external data packet at a standby PTP follower port of the standby member node,
      to synchronize the clock of the standby member node using a PTP timestamp included in the third external data packet, and
      to cause each of the plurality of second member nodes other than the standby member node to perform a second internal clock synchronization operation, the second internal clock synchronization including:
         receiving, at the PTP follower port of the respective second member node, an internal data packet from the PTP leader port of the member node immediately upstream of the respective second member node, wherein the internal data packet includes an internal PTP timestamp based on the clock of the member node immediately upstream of the respective second member node, and
         synchronizing a clock of the respective second member node based on the internal timestamp of the internal data packet.

6. The network device of claim 5, wherein
   after the second internal clock synchronization operation, the network device is configured to transmit, from the respective PTP leader ports of the standby member node and/or respective ones of the plurality of second member nodes other than the standby member node to a plurality of downstream devices, a corresponding number of fourth external data packets, and
   the fourth external data packets respectively include the second external timestamp based on the synchronized clock of the transmitting member node.

7. The network device of claim 5, wherein the standby PTP follower port of the standby member node is a Link Aggregation Group (LAG) port or dual Routed Only Ports (ROPs).

8. The network device of claim 5, wherein the standby member node is configured to activate a connection between the standby PTP follower port of the standby member node and an external device upstream from the network device upon detecting that the fault has occurred in the first member node.

9. A non-transitory computer-readable medium storing instructions that, when executed by an electronic processor of a primary member node, cause the primary member node to:
   configure a plurality of member nodes of a stacked network device to function as a single virtual device to external devices, wherein the plurality of member nodes includes the primary member node and a plurality of secondary member nodes interconnected by member links to exchange data plane traffic, the primary member node being configured to perform control and management plane operations on behalf of the stacked network device;
receive, at an uplink port of the primary member node, a first external Precision Time Protocol (PTP) data packet including a first external timestamp from an external clock device operating according to an external PTP domain;
synchronize a clock of the primary member node based on the first external timestamp;
generate an internal PTP data packet according to an internal instance of PTP that is local to the first stacked network device, the internal PTP data packet including an internal time stamp based on the clock of the primary member node;
transmit the internal data packet from a downlink port of the primary member node to an uplink port of the secondary member node immediately downstream of the primary member node; and
cause a transmission, from one or more downlink ports of the primary member node and/or respective ones of the plurality of secondary member nodes to one or more downstream external devices, of a corresponding number of second external data packets, wherein the second external data packets respectively include a second external timestamp based on the synchronized clock of the primary member node.

10. The non-transitory computer-readable medium of claim 9, wherein synchronizing the clock includes:
determining an amount of delay between the primary member node and the external clock device;
adding the amount of delay to the internal time stamp to obtain a modified timestamp; and
setting the clock of the primary member node based on the modified timestamp.

11. The non-transitory computer-readable medium of claim 9, wherein the respective second external data packets include an address corresponding to the stacked network device as a whole.

12. The non-transitory computer-readable medium of claim 9, wherein the stacked network device is a boundary clock device of a network operating according to PTP.

13. The non-transitory computer-readable medium of claim 9, wherein the primary member node and the plurality of secondary member nodes form one of a chain topology or a ring topology.

14. A method of implementing a time synchronization protocol in a network device including a primary member node and a plurality of secondary member nodes, the method comprising:
configuring a plurality of member nodes of a network device to function as a single virtual device to external devices, wherein the plurality of member nodes includes a primary node and a plurality of secondary member nodes interconnected by member links to exchange data plane traffic, the primary member node being configured to perform control and management plane operations on behalf of the network device;
receiving, at an uplink port the primary member node, a first external data packet including a first external timestamp based on a known global clock;
synchronizing a clock of the primary member node to the known global clock;
for each of the plurality of secondary member nodes:
receiving, at an uplink port of the respective secondary member node, an internal data packet from a member node immediately upstream of the respective secondary member node, wherein the internal data packet includes an internal timestamp based on a clock of the member node immediately upstream of the respective secondary member node, and
synchronizing a clock of the respective secondary member node to the known global clock based on the internal timestamp of the internal data packet; and
transmitting, from respective downlink ports of the primary member node and/or respective ones of the plurality of secondary member nodes to a plurality of second network devices, a second external data packet, wherein the second external data packet includes a second external timestamp based on the synchronized clock of the transmitting member node.

15. The method of claim 14, wherein the first external data packet and the second external data packet correspond to a first PTP instance, and wherein the internal data packets correspond to a second PTP instance.

16. The method of claim 14, further comprising:
designating one of the plurality of secondary member nodes as a standby member node;
detecting that a fault has occurred in the primary member node; and
subsequently:
receiving, at an uplink port of the standby member node, a third external data packet including the first external timestamp,
synchronizing a clock of the standby member node based on the first external timestamp,
for each of the plurality of secondary member nodes other than the standby member node:
receiving, at the uplink port of the respective secondary member node, the internal data packet from the member node immediately upstream of the respective secondary member node, wherein the internal data packet includes the internal timestamp based on the clock of the member node immediately upstream of the respective secondary member node, and
synchronizing the clock of the respective secondary member node based on the internal timestamp of the internal data packet, and
transmitting, from the respective downlink ports of the standby member node and/or the respective ones of the plurality of secondary member nodes other than the standby member node to the plurality of second network devices, the second external data packet, wherein the second external data packet includes the second external timestamp based on the synchronized clock of the transmitting member node.

17. The method of claim 16, further comprising:
detecting that the fault in the primary member node has been resolved; and
subsequently:
receiving, at the uplink port of the primary member node, the internal data packet from the member node immediately upstream of the primary member node, wherein the internal data packet includes the internal timestamp based on the clock of the member node immediately upstream of the primary member node, and
synchronizing the clock of the primary member node based on the internal timestamp of the internal data packet, and
transmitting, from the downlink port of the primary member node to at least one of the plurality of second network devices, the second external data packet, wherein the second external data packet includes the second external timestamp based on the synchronized clock of the primary member node.

18. The method of claim 14, wherein the respective second external data packets include an address corresponding to the network device as a whole.

19. The method of claim 14, wherein the network device is a boundary clock device of a network operating according to PTP.

20. The method of claim 14, wherein the primary member node and the plurality of secondary member nodes form one of a chain topology or a ring topology.

* * * * *